United States Patent
Li et al.

(10) Patent No.: US 11,635,590 B2
(45) Date of Patent: Apr. 25, 2023

(54) OPTICAL IMAGING SYSTEM INCLUDING FIVE LENSES OF −+−+−, −+−++, −+−−+ OR −+−−− REFRACTIVE POWERS

(71) Applicant: Zhejiang Sunny Optical Co., Ltd, Ningbo (CN)

(72) Inventors: Yanping Li, Ningbo (CN); Lingbo He, Ningbo (CN); Jianke Wenren, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 294 days.

(21) Appl. No.: 16/925,314

(22) Filed: Jul. 9, 2020

(65) Prior Publication Data
US 2021/0033822 A1 Feb. 4, 2021

(30) Foreign Application Priority Data
Jul. 30, 2019 (CN) .................. CN201910695294

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC .................. G02B 13/0045; G02B 9/60
See application file for complete search history.

(56) References Cited

U.S. PATENT DOCUMENTS

2017/0168266 A1* 6/2017 Hsu ................. G02B 27/0025
2018/0299648 A1* 10/2018 Hsueh ..................... G02B 9/60
2020/0379217 A1* 12/2020 Huang .................. G02B 13/04

* cited by examiner

*Primary Examiner* — Wen Huang
(74) *Attorney, Agent, or Firm* — Barnes & Thornburg LLP

(57) ABSTRACT

The present disclosure discloses an optical imaging system including, sequentially from an object side to an image side along an optical axis, a first lens having a negative refractive power with a concave object-side surface and a concave image-side surface; a second lens having a refractive power; a third lens having a negative refractive power; a fourth lens having a refractive power with a concave object-side surface, and a convex image-side surface; and a fifth lens having a refractive power. An effective focal length f1 of the first lens and an effective focal length f2 of the second lens satisfy −2.3≤f1/f2<−1.5.

18 Claims, 12 Drawing Sheets

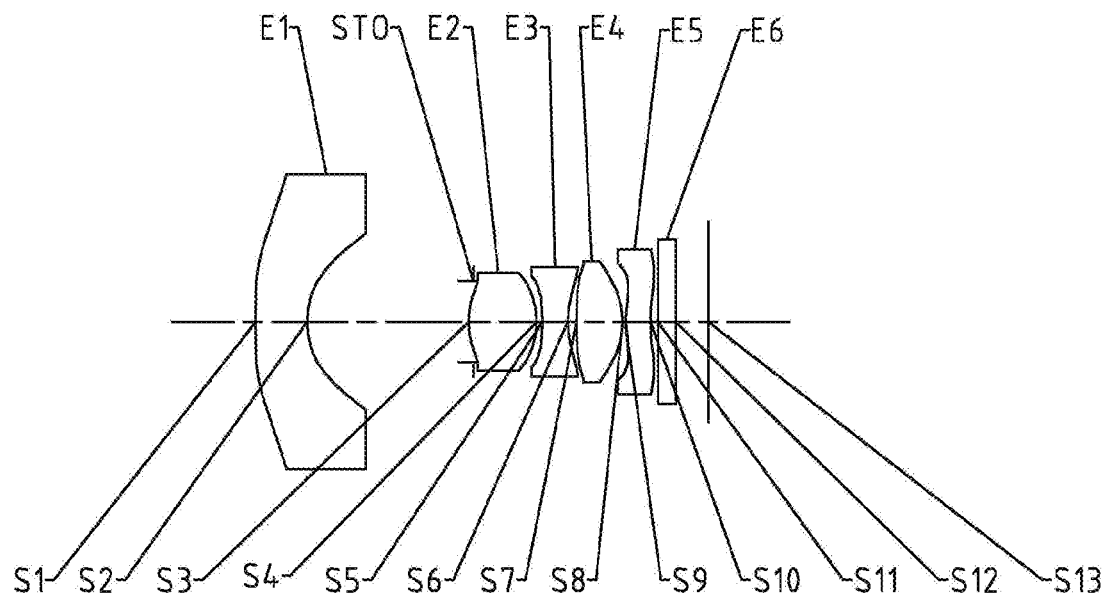
Fig. 5
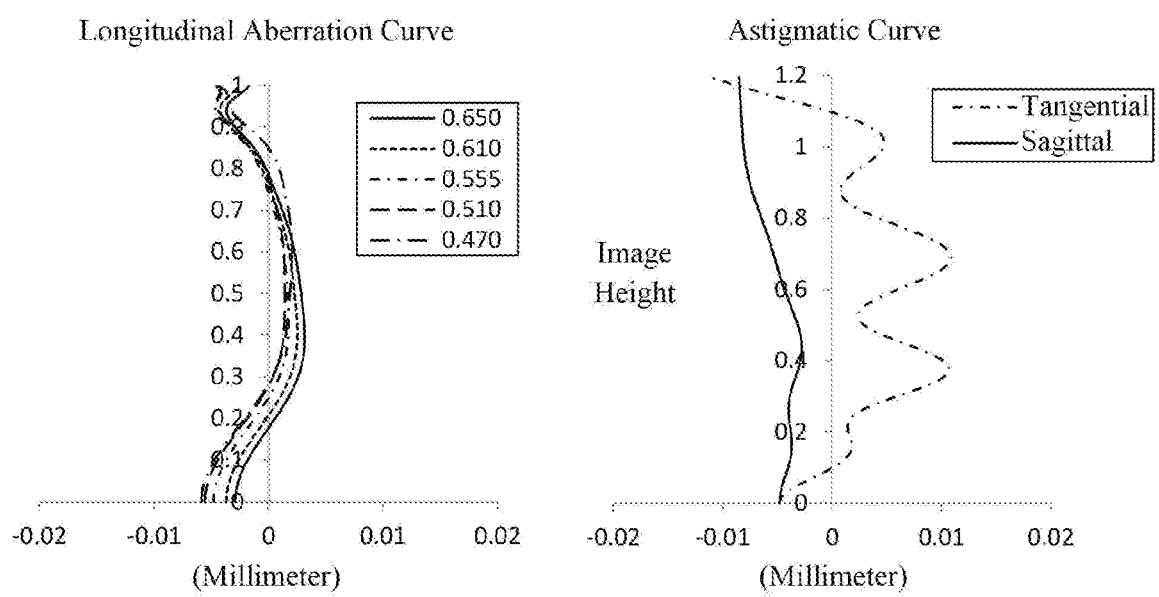
Fig. 6A
Fig. 6B

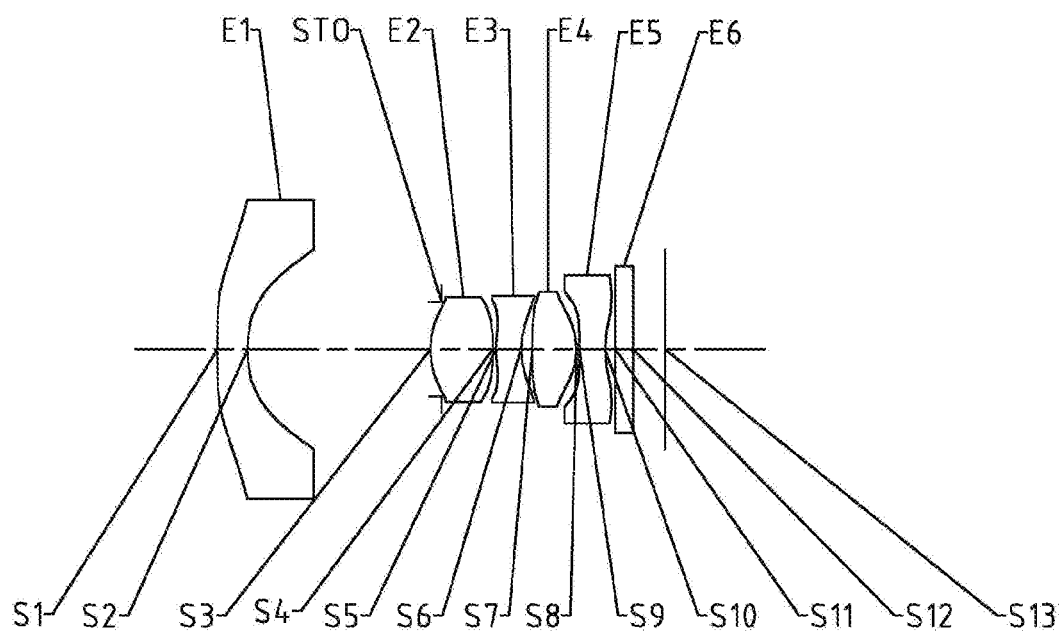
Fig. 13
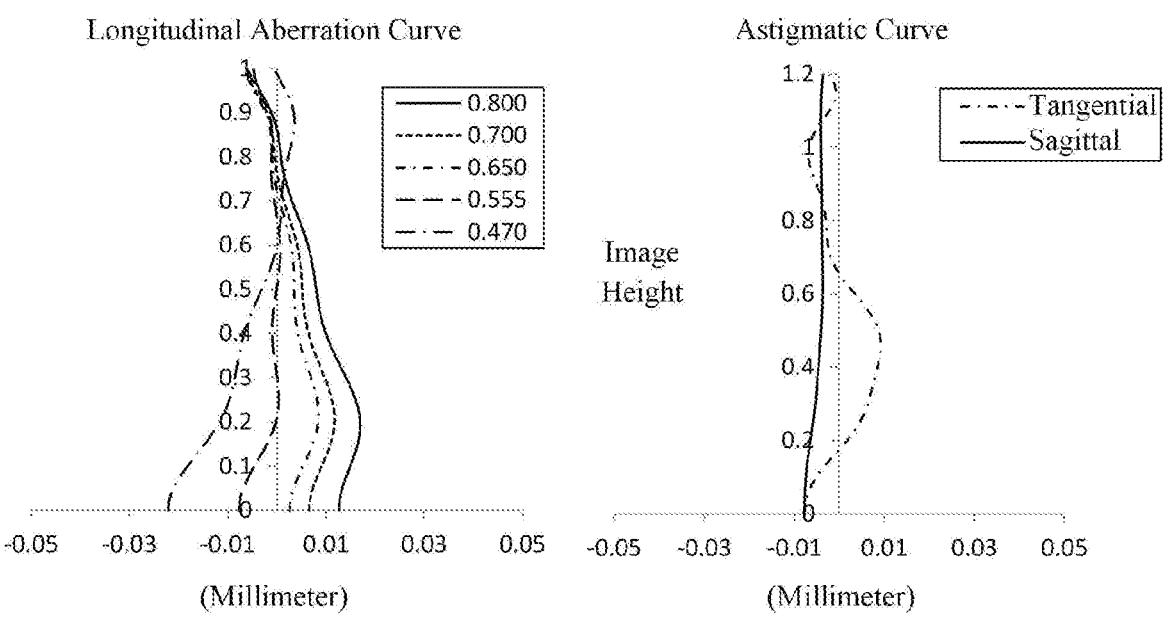
Fig. 14A
Fig. 14B

OPTICAL IMAGING SYSTEM INCLUDING FIVE LENSES OF −+−+−, −+−++, −+−−+ OR −+−−− REFRACTIVE POWERS

CROSS-REFERENCE TO RELATED APPLICATION

This application claims benefit of priority to Chinese Patent Application No. 201910695294.7 filed on Jul. 30, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including five lenses.

BACKGROUND

In recent years, with the development of science and technology, the market demand for imaging systems suitable for portable electronic products has gradually increased. For example, the lens mounted on a mobile phone has developed from a single-camera lens to a multi-camera lens often includes a wide-angle imaging system. Moreover, the rapid development of mobile phone imaging systems, especially the popularity of large-sized, high-pixel CMOS chips, has caused mobile phone manufacturers to place more stringent requirements on the imaging quality of the imaging systems. In addition, as the performance of CCD and CMOS elements increases and the size thereof reduces, higher requirements for high imaging quality and miniaturization are placed on the matched imaging systems.

In order to meet the requirements of miniaturization and imaging requirements, an optical imaging system that can simultaneously satisfy the characteristics of wide angle, large aperture, high imaging quality and miniaturization is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having a negative refractive power, an object-side surface thereof may be a concave surface, and an image-side surface thereof may be a concave surface; a second lens having a refractive power; a third lens having a negative refractive power; a fourth lens having a refractive power, an object-side surface thereof may be a concave surface, and an image-side surface thereof may be a convex surface; and a fifth lens having a refractive power.

In one embodiment, an effective focal length f1 of the first lens and an effective focal length f2 of the second lens may satisfy $-2.3 \le f1/f2 < -1.5$.

In one embodiment, a radius of curvature R1 of the object-side surface of the first lens and an entrance pupil diameter EPD of the optical imaging system may satisfy $-2.0 < R1/EPD/10 < -1.0$.

In one embodiment, a radius of curvature R9 of an object-side surface of the fifth lens and a radius of curvature R10 of an image-side surface of the fifth lens may satisfy $0 < R10/R9 \le 1.8$.

In one embodiment, half of a diagonal length ImgH of an effective pixel area on an imaging plane of the optical imaging system and an effective focal length f of the optical imaging system may satisfy $1.0 < ImgH/f < 2.0$.

In one embodiment, an on-axis distance TTL from the object-side surface of the first lens to an imaging plane of the optical imaging system and a spaced interval T12 between the first lens and the second lens along the optical axis may satisfy $2.0 < TTL/T12 < 3.0$.

In one embodiment, a radius of curvature R2 of the image-side surface of the first lens, a radius of curvature R3 of an object-side surface of the second lens and an effective focal length f of the optical imaging system may satisfy $2.5 < |R2/f| + |R3/f| < 3.5$.

In one embodiment, an on-axis distance SAG11 from an intersection of the object-side surface of the first lens and the optical axis to an vertex of an effective radius of the object-side surface of the first lens and an on-axis distance SAG12 from an intersection of the image-side surface of the first lens and the optical axis to an vertex of an effective radius of the image-side surface of the first lens may satisfy $1.5 < SAG12/SAG11 < 2.5$.

In one embodiment, a combined focal length f23 of the second lens and the third lens and a combined focal length f12 of the first lens and the second lens may satisfy $1.0 < f23/f12 \le 3.0$.

In one embodiment, an edge thickness ET1 of the first lens and a center thickness CT1 of the first lens along the optical axis may satisfy $1.5 < ET1/CT1 < 2.5$.

In one embodiment, half of a maximal field-of-view Semi-FOV of the optical imaging system, an aperture value Fno of the optical imaging system and an effective focal length f of the optical imaging system may satisfy $2.5 \text{ mm}^{-1} < (\tan(\text{Semi-FOV}) + Fno)/f < 3.7 \text{ mm}^{-1}$.

In one embodiment, a sum of spaced intervals ΣAT along the optical axis between each two adjacent lenses of the first lens to the fifth lens and a center thickness CT2 of the second lens along the optical axis may satisfy $2.5 < \Sigma AT/CT2 < 3.5$.

The present disclosure employs five lenses, and the optical imaging system has at least one advantageous effect such as wide-angle, large aperture and high image quality and the like by rationally matching the lenses of different materials and rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging system according to Example 3 of the present disclosure; and FIGS. 6A to 6D illustrate a longitudinal aberration curve, an astigmatic curve, a distortion curve, and a lateral color curve of the optical imaging system of the Example 3, respectively.

FIG. 13 illustrates a schematic structural view of an optical imaging system according to Example 7 of the present disclosure; and FIGS. 14A to 14D illustrate a longitudinal aberration curve, an astigmatic curve, a distortion curve, and a lateral color curve of the optical imaging system of the Example 7, respectively.

DETAILED DESCRIPTION OF EMBODIMENTS

Figure 1:
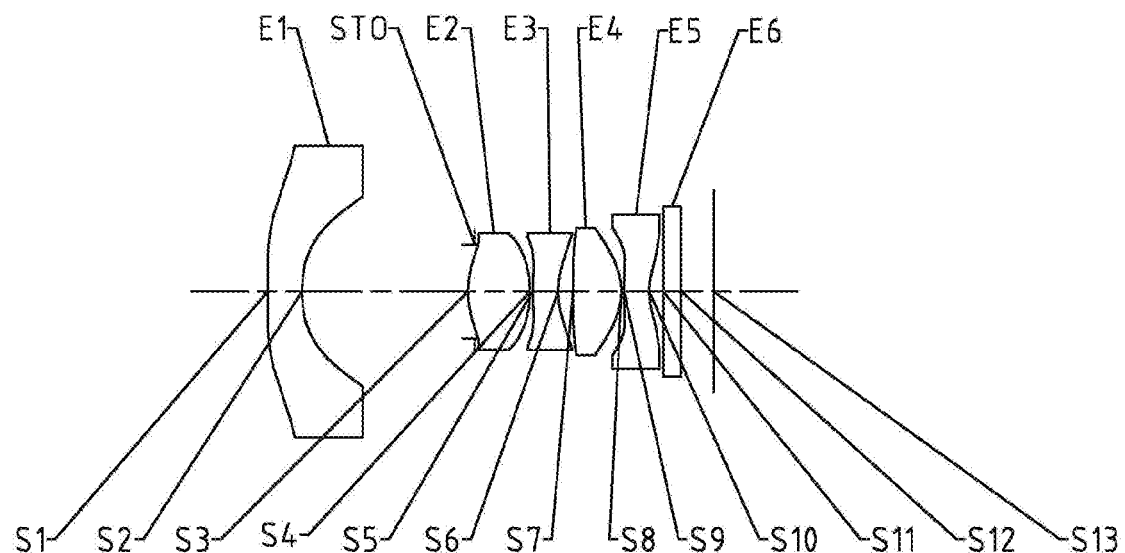
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, five lenses having refractive power, that is, a first lens, a second lens, a third lens, a fourth lens and a fifth lens. The five lenses are arranged sequentially from an object side to an image side along an optical axis. Among the first lens to the five lens, there is an air interval between each two adjacent lenses.

In an exemplary embodiment, the first lens has a negative refractive power, an object-side surface thereof may be a concave surface, and an image-side surface thereof may be a concave surface; the second lens has a positive or a negative refractive power; the third lens may have a negative refractive power; the fourth lens has a positive or a negative refractive power, an object-side surface thereof may be a concave surface, and an image-side surface thereof may be a convex surface; and the fifth lens has a positive or a negative refractive power. In an exemplary embodiment, the optical imaging system described above may further include at least one stop. The stop may be disposed at an appropriate position as needed, for example, between the first lens and the second lens. Optionally, the above optical imaging system may further include an optical filter for correcting the color deviation and/or a protective glass for protecting the photosensitive element located on an imaging plane.

The first lens with a negative refractive power and two concave surfaces is beneficial to increase the field-of-view of the optical imaging system. In addition, the first lens configured in this way is also beneficial to reduce the incident angle of light at the position of the stop, and to reduce the pupil aberration, thereby improving the imaging quality of the optical imaging system. The matching of the refractive power of the second lens and the refractive power of the third lens is beneficial to reduce the spherical aberration and astigmatic of the optical imaging system. The refractive power of the fourth lens matches the refractive power of the fifth lens, and the object-side surface of the fifth lens is set as a concave surface, and the image-side surface thereof is set as a convex surface, which is beneficial to achieve a long back focus. In addition, by doing so, the structure of the optical imaging system is compact and has the characteristics of miniaturization. By reasonably controlling the positive and negative refractive power of each component of the system and the curvature of each lens's surface, the imaging quality of the optical imaging system may be effectively improved, and the optical imaging system may be easily manufactured.

In an exemplary embodiment, the second lens may have a positive refractive power.

In an exemplary embodiment, the optical imaging system according to the present disclosure may satisfy: $-2.3 \leq f1/f2 < -1.5$, where f1 is an effective focal length of the first lens and f2 is an effective focal length of the second lens. More specifically, f1 and f2 may satisfy: $-2.29 \leq f1/f2 < -1.54$. By controlling the ratio of the effective focal length of the first lens to the effective focal length of the second lens, the first lens and the second lens may provide sufficient refractive power while contributing less negative spherical aberration. The lenses at the image side of the second lens can easily correct the negative spherical aberration, so that the on-axis field-of-view of the optical imaging system has a better image quality.

In an exemplary embodiment, the optical imaging system according to the present disclosure may satisfy: $-2.0 < R1/EPD/10 < -1.0$, where R1 is a radius of curvature of the object-side surface of the first lens and EPD is an entrance pupil diameter of the optical imaging system. More specifically, R1 and EPD may satisfy: $-1.63 < R1/EPD/10 < -1.11$. Constraining the relationship between the radius of curvature of the object-side surface of the first lens and the entrance pupil diameter of the optical imaging system is beneficial to control the aperture of the first lens, and thus the light flux of the optical imaging system is improved.

In an exemplary embodiment, the optical imaging system according to the present disclosure may satisfy: $0 < R10/R9 \leq 1.8$, where R9 is a radius of curvature of an object-side surface of the fifth lens and R10 is a radius of curvature of an image-side surface of the fifth lens. More specifically, R9 and R10 may satisfy: $0.11 < R10/R9 \leq 1.79$. By controlling the surface shapes of the two mirror surfaces of the fifth lens, the thickness distribution of the fifth lens along the optical axis may be controlled, so that the fifth lens has good workability.

In an exemplary embodiment, the optical imaging system according to the present disclosure may satisfy: $1.0 < ImgH/f < 2.0$, where ImgH is half of a diagonal length of an effective pixel area on an imaging plane of the optical imaging system and f is an effective focal length of the optical imaging system. More specifically, ImgH and f satisfy: $1.08 < ImgH/f < 1.71$. By controlling the ratio of the half of the diagonal length of the effective pixel area on the imaging plane to the effective focal length of the optical imaging system, the value of the effective focal length may be effectively ensured, thereby ensuring the characteristics of the large aperture of the optical imaging system to have a better photographic effect in a dim environment while being anti-shake.

In an exemplary embodiment, the optical imaging system according to the present disclosure may satisfy: $2.0 < TTL/T12 < 3.0$, where TTL is an on-axis distance from the object-side surface of the first lens to an imaging plane of the optical imaging system and T12 is a spaced interval between the first lens and the second lens along the optical axis. More specifically, TTL and T12 may satisfy: $2.43 < TTL/T12 < 2.83$. By controlling the ratio of the total track length of the optical imaging system to the spaced interval between the first lens and the second lens, the optical imaging system has a structure that is easy to manufacture and assemble, and the optical imaging system has a compact structure.

In an exemplary embodiment, the optical imaging system according to the present disclosure may satisfy: $2.5 < |R2/f| + |R3/f| < 3.5$, where R2 is a radius of curvature of the image-side surface of the first lens, R3 is a radius of curvature of an object-side surface of the second lens and f is an effective focal length of the optical imaging system. More specifically, R2, R3 and f may satisfy: $2.92 < |R2/f| + |R3/f| < 3.31$. By controlling the radius of curvature of the image-side surface of the first lens, the radius of curvature of the object-side surface of the second lens, and the effective focal length of the optical imaging system to satisfy the aforementioned relationship, the contributions of the first lens and the second lens to the fifth-order spherical aberration and third-order astigmatic of the optical imaging system are advantageously reduced, so that the amount of astigmatic and fifth-order spherical aberration generated by the first and the second lenses and the amount of astigmatic and fifth-order spherical aberration generated by the lenses at the image side of the second lens are better compensated, thereby the optical imaging system has a good imaging quality.

In an exemplary embodiment, the optical imaging system according to the present disclosure may satisfy: $1.5 < SAG12/SAG11 < 2.5$, where SAG11 is an on-axis distance from an intersection of the object-side surface of the first lens and the optical axis to an vertex of an effective radius of the object-side surface of the first lens and SAG12 is an on-axis distance from an intersection of the image-side surface of the first lens and the optical axis to an vertex of an effective radius of the image-side surface of the first lens. More specifically, SAG11 and SAG12 may satisfy: $1.87 < SAG12/SAG11 < 2.46$. Controlling the respective sagittal heights of the two mirror surfaces of the first lens is beneficial to control the thickness of the first lens, so that the first lens may be easily processed.

In an exemplary embodiment, the optical imaging system according to the present disclosure may satisfy: $1.0 < f23/f12 \leq 3.0$, where f23 is a combined focal length of the second lens and the third lens and f12 is a combined focal length of the first lens and the second lens. More specifically, f23 and f12 may satisfy: $1.02 < f23/f12 \leq 2.94$. By controlling the ratio of the combined focal length of the second lens and the third lens to the combined focal length of the first lens and the second lens, the spherical aberrations contributed by the first lens, the second lens, and the third lens to the optical imaging system may be reduced, thereby making the on-axis field-of-view of the optical imaging system have good imaging quality.

In an exemplary embodiment, the optical imaging system according to the present disclosure may satisfy: $1.5<ET1/CT1<2.5$, where ET1 is an edge thickness of the first lens and CT1 is a center thickness of the first lens along the optical axis. More specifically, ET1 and CT1 may satisfy: $1.54<ET1/CT1<2.28$. By controlling the edge thickness and center thickness of the first lens, the shape of the first lens can be effectively controlled, and the thickness of the first lens can be evenly distributed, so that the first lens is easily processed and shaped.

In an exemplary embodiment, the optical imaging system according to the present disclosure may satisfy: $2.5\text{ mm}^{-1}<(\tan(\text{Semi-FOV})+Fno)/f<3.7\text{ mm}^{-1}$, where Semi-FOV is half of a maximal field-of-view of the optical imaging system, Fno is an aperture value of the optical imaging system and f is an effective focal length of the optical imaging system. More specifically, Semi-FOV, Fno and f may satisfy: $2.51\text{ mm}^{-1}<(\tan(\text{Semi-FOV})+Fno)/f<3.69\text{ mm}^{-1}$. By reasonably controlling the half of a maximal field-of-view, the aperture value and the effective focal length of the optical imaging system, the optical imaging system has the characteristics of large aperture and wide-angle. The optical imaging lens assembly has a large aperture while ensuring wide-angle characteristics, which may increase the shutter speed of the optical imaging lens assembly. The optical imaging system provided by the present disclosure is used to capture an image, and the captured images have a good background blur effect. In addition, the optical imaging system provided in this disclosure may be used in a dim environment to obtain a good image.

In an exemplary embodiment, the optical imaging system according to the present disclosure may satisfy: $2.5<\Sigma AT/CT2<3.5$, where $\Sigma AT$ is a sum of spaced intervals along the optical axis between each two adjacent lenses of the first lens to the fifth lens and CT2 is a center thickness of the second lens along the optical axis. As an example, $\Sigma AT=T12+T23+T34+T45$, where T12 is a spaced interval between the first lens and the second lens along the optical axis, T23 is a spaced interval between the second lens and the third lens along the optical axis, T34 is a spaced interval between the third lens and the fourth lens along the optical axis, T45 is a spaced interval between the fourth lens and the fifth lens along the optical axis. More specifically, $\Sigma AT$ and CT2 may satisfy: $2.56<\Sigma AT/CT2<3.31$. By controlling the ratio of the sum of the spaced intervals along the optical axis between each two adjacent lenses with refractive power from the first lens to the lens closest to the imaging plane to the center thickness of the second lens, the shape of the first lens and the shape of the second lens may be effectively controlled and balanced, thereby making the optical imaging system have good processability. In addition, controlling the ratio of $\Sigma AT$ to CT2 is also beneficial to control the distortion produced by the first lens and the second lens, so that the optical imaging lens assembly has a good distortion performance.

The optical imaging system according to the above embodiments of the present disclosure may employ a plurality of lenses, such as five lenses as described above. By properly assigning the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as large wide-angle, large aperture, and high imaging quality.

In the embodiments of the present disclosure, at least one of the surfaces of each lens is aspheric, that is, at least one of the object-side surface and the image-side surface of each of the first lens, the second lens, the third lens, the fourth lens, and the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens and the fifth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking five lenses as an example, the optical imaging system is not limited to include five lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 300.0000 | | | | |
| S1 | aspheric | −7.6692 | 0.4083 | 1.54 | 55.8 | −2.86 | 16.6816 |
| S2 | aspheric | 1.9563 | 2.0510 | | | | 0.4505 |
| STO | spherical | infinite | −0.0784 | | | | |
| S3 | aspheric | 1.2198 | 0.7378 | 1.54 | 55.8 | 1.32 | 1.7153 |
| S4 | aspheric | −1.3453 | 0.0300 | | | | 0.6008 |
| S5 | aspheric | 2.5981 | 0.3000 | 1.64 | 23.8 | −2.31 | −60.5939 |
| S6 | aspheric | 0.8999 | 0.1802 | | | | 0.1876 |
| S7 | aspheric | −120.7514 | 0.5748 | 1.59 | 61.2 | 1.34 | −99.0000 |
| S8 | aspheric | −0.7912 | 0.0300 | | | | −0.2621 |
| S9 | aspheric | 2.0405 | 0.3000 | 1.64 | 23.8 | −2.11 | 0.7110 |
| S10 | aspheric | 0.7668 | 0.1676 | | | | −0.9643 |
| S11 | spherical | infinite | 0.2100 | 1.52 | 64.2 | | |
| S12 | spherical | infinite | 0.3867 | | | | |
| S13 | spherical | infinite | | | | | |

In example 1, a total effective focal length f of the optical imaging system is 1.04 mm, an aperture value Fno of the optical imaging system is 1.64, an on-axis distance TTL from the object-side surface of the first lens to the imaging plane is 5.30 mm, half of a diagonal length ImgH of an effective pixel area on the imaging plane is 1.20 mm, and half of a maximal field-of-view Semi-FOV is 48.3°.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | 4.0421E−01 | −5.3487E−01 | 5.6864E−01 | −4.5398E−01 | 2.5519E−01 |
| S2 | 4.9502E−01 | −1.6881E−01 | −1.7129E+00 | 6.5104E+00 | −1.2490E+01 |
| S3 | −2.0755E−01 | 6.7456E−01 | −1.4420E+01 | 1.1077E+02 | −5.3061E+02 |
| S4 | −5.1784E−01 | 7.4900E+00 | −6.5536E+01 | 3.6144E+02 | −1.3309E+03 |
| S5 | −9.1982E−01 | 6.0372E−01 | −5.7699E+01 | 3.4569E+02 | −1.3941E+03 |
| S6 | −9.3880E−01 | 7.3097E−01 | 1.2229E+00 | −3.0065E+01 | 1.6522E+02 |
| S7 | 3.9919E−01 | −1.7216E+00 | 9.4765E+00 | −4.9432E+01 | 1.7112E+02 |
| S8 | 2.6630E−01 | 1.8658E+00 | −1.8753E+01 | 1.1449E+02 | −4.3177E+02 |
| S9 | −1.4516E+00 | 3.8522E+00 | −3.2348E+01 | 2.0325E+02 | −7.7357E+02 |
| S10 | −1.5627E+00 | 2.3041E+00 | −2.0350E+00 | 9.7281E−01 | −3.0285E+00 |

| Surface number | A14 | A16 | A18 | A20 |
|---|---|---|---|---|
| S1 | −9.6790E−02 | 2.3484E−02 | −3.2866E−03 | 2.0209E−04 |
| S2 | 1.4258E+01 | −9.7174E+00 | 3.6416E+00 | −5.7652E−01 |
| S3 | 1.5034E+03 | −2.4898E+03 | 2.2188E+03 | −9.4728E+02 |
| S4 | 3.2042E+03 | −4.8501E+03 | 4.2036E+03 | −1.6028E+03 |
| S5 | 3.7952E+03 | −6.7535E+03 | 7.1649E+03 | −3.4233E+03 |
| S6 | −4.8561E+02 | 8.2255E+02 | −7.5259E+02 | 2.9090E+02 |
| S7 | −3.9354E+02 | 5.8147E+02 | −4.7071E+02 | 1.5158E+02 |
| S8 | 1.0181E+03 | −1.4650E+03 | 1.1825E+03 | −4.0753E+02 |
| S9 | 1.8078E+03 | −2.5512E+03 | 2.0007E+03 | −6.6996E+02 |
| S10 | 1.0331E+01 | −1.5000E+01 | 1.0143E+01 | −2.6636E+00 |

Figures 2A, 2B:
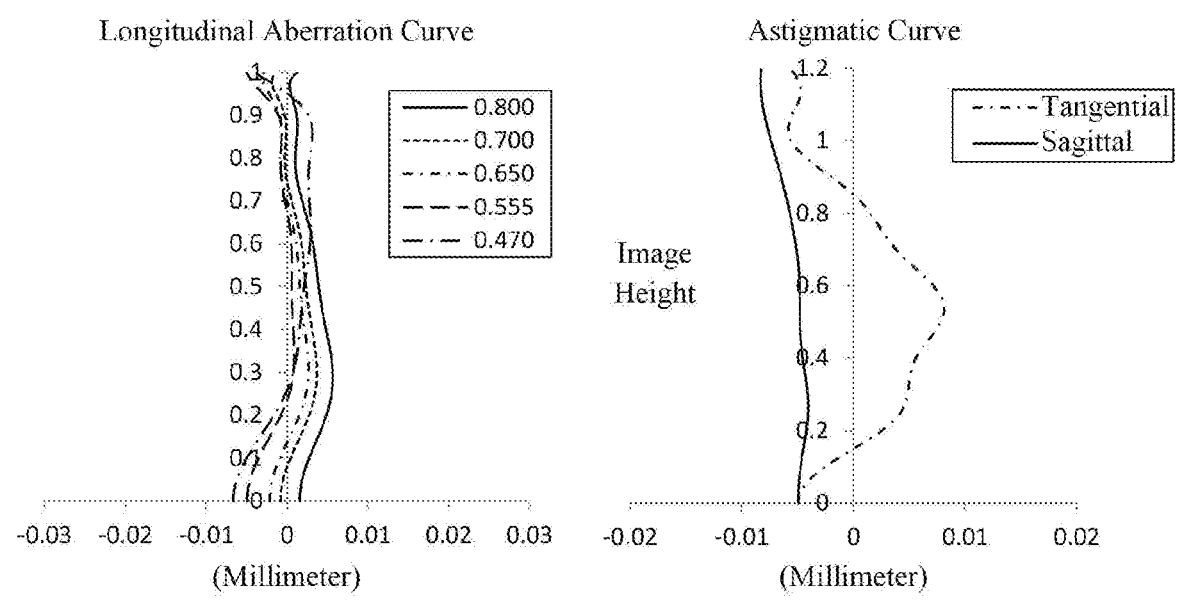
FIGS. 2A to 2D illustrate a longitudinal aberration curve, an astigmatic curve, a distortion curve, and a lateral color curve of the optical imaging system of the Example 1, respectively.
Figure 2C:
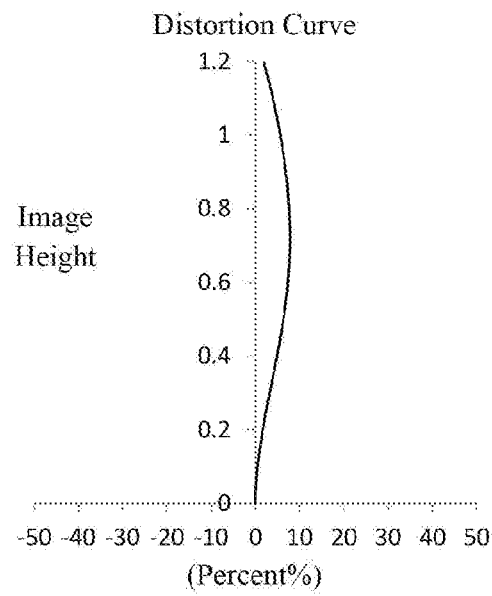
Figure 2D:
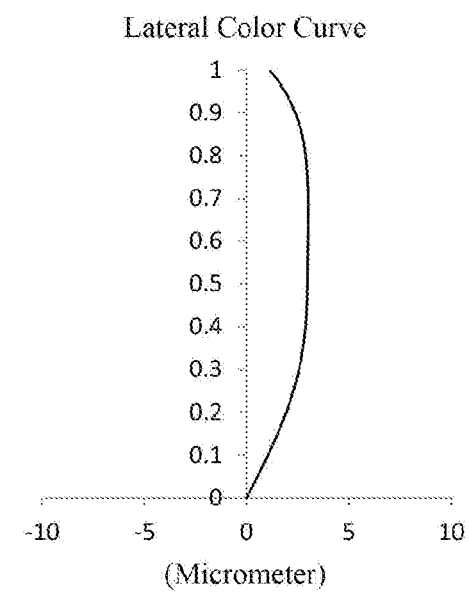

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different image heights. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve a good image quality.

Example 2

Figure 3:
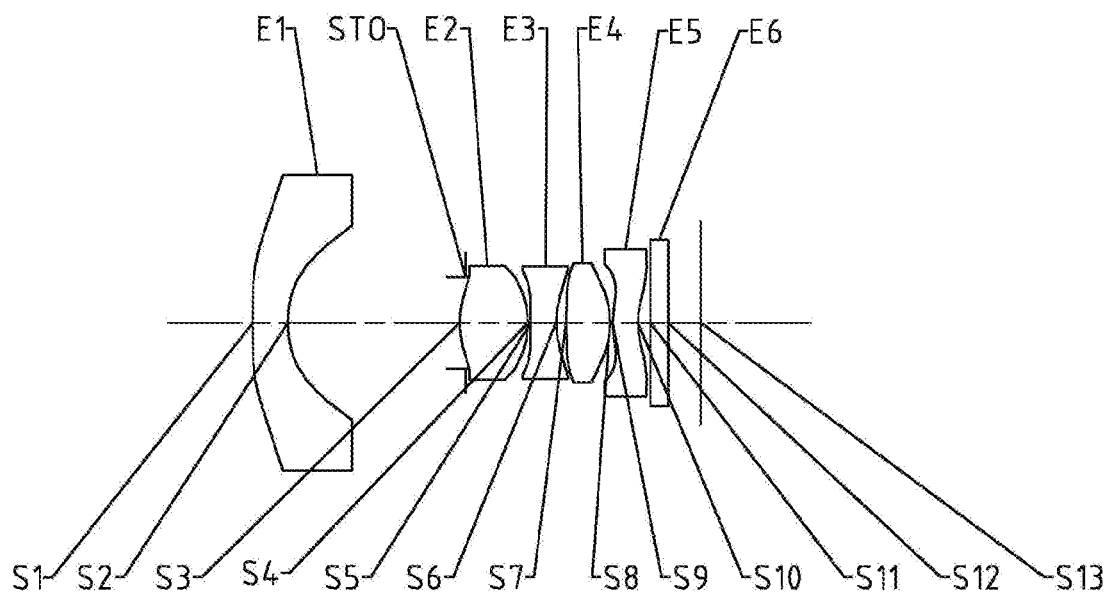
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 2, a total effective focal length f of the optical imaging system is 0.90 mm, an aperture value Fno of the optical imaging system is 1.55, an on-axis distance TTL from the object-side surface of the first lens to the imaging plane is 5.30 mm, half of a diagonal length ImgH of an effective pixel area on the imaging plane is 1.20 mm, and half of a maximal field-of-view Semi-FOV is 48.3°.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 300.0000 | | | | |
| S1 | aspheric | −7.6580 | 0.4137 | 1.54 | 55.8 | −2.53 | 16.1103 |
| S2 | aspheric | 1.6833 | 2.1014 | | | | −0.0201 |
| STO | spherical | infinite | −0.0693 | | | | |
| S3 | aspheric | 1.1582 | 0.8083 | 1.54 | 55.8 | 1.26 | 1.4043 |
| S4 | aspheric | −1.2233 | 0.0309 | | | | 0.9282 |
| S5 | aspheric | 3.2755 | 0.3000 | 1.64 | 23.8 | −1.95 | −99.0000 |
| S6 | aspheric | 0.8725 | 0.1177 | | | | 0.1147 |
| S7 | aspheric | −60.0000 | 0.5204 | 1.59 | 61.2 | 2.45 | −99.0000 |
| S8 | aspheric | −1.4197 | 0.0300 | | | | 0.6553 |
| S9 | aspheric | 0.9663 | 0.3000 | 1.64 | 23.8 | 16.70 | −1.9658 |
| S10 | aspheric | 0.9336 | 0.1486 | | | | −0.8302 |
| S11 | spherical | infinite | 0.2100 | 1.52 | 64.2 | | |
| S12 | spherical | infinite | 0.3867 | | | | |
| S13 | spherical | infinite | | | | | |

TABLE 4

| Surface number | A4 | A6 | A8 | A10 | A12 |
|---|---|---|---|---|---|
| S1 | 4.8244E−01 | −6.6913E−01 | 6.7746E−01 | −5.0015E−01 | 2.5952E−01 |
| S2 | 5.5465E−01 | 1.2124E−01 | −3.9145E+00 | 1.2170E+01 | −2.0790E+01 |
| S3 | −2.7722E−01 | 1.6703E+00 | −3.7606E+01 | 3.9499E+02 | −2.5815E+03 |
| S4 | −1.8132E+00 | 2.3646E+01 | −1.8862E+02 | 1.0044E+03 | −3.6293E+03 |
| S5 | −2.6208E+00 | 2.1065E+01 | −1.5659E+02 | 8.1971E+02 | −2.9332E+03 |
| S6 | −1.1700E+00 | −1.2858E+00 | 3.6553E+01 | −2.9153E+02 | 1.3470E+03 |
| S7 | 1.1078E+00 | −6.2036E+00 | 3.2590E+01 | −1.3414E+02 | 3.8322E+02 |
| S8 | −1.4855E+00 | 1.1104E+01 | −7.0069E+01 | 3.6366E+02 | −1.3062E+03 |
| S9 | −2.1053E+00 | 9.2340E+00 | −1.0117E+02 | 6.9102E+02 | −2.8344E+03 |
| S10 | 6.7725E−02 | −1.0186E+01 | 5.2453E+01 | −1.5318E+02 | 2.8876E+02 |

TABLE 4-continued

| Surface number | A14 | A16 | A18 | A20 |
|---|---|---|---|---|
| S1 | −9.1045E−02 | 2.0485E−02 | −2.6681E−03 | 1.5338E−04 |
| S2 | 2.1676E+01 | −1.3649E+01 | 4.7620E+00 | −7.0634E−01 |
| S3 | 1.0395E+04 | −2.5303E+04 | 3.4092E+04 | −1.9740E+04 |
| S4 | 8.6634E+03 | −1.2986E+04 | 1.1016E+04 | −4.0213E+03 |
| S5 | 6.8776E+03 | −9.9158E+03 | 7.8383E+03 | −2.5180E+03 |
| S6 | −3.8961E+03 | 6.9695E+03 | −7.0498E+03 | 3.0724E+03 |
| S7 | −7.0582E+02 | 8.3309E+02 | −6.0940E+02 | 2.2068E+02 |
| S8 | 3.0480E+03 | −4.3837E+03 | 3.5202E+03 | −1.2011E+03 |
| S9 | 7.2563E+03 | −1.1454E+04 | 1.0232E+04 | −3.9805E+03 |
| S10 | −3.5536E+02 | 2.7495E+02 | −1.2112E+02 | 2.3124E+01 |

Figure 4A:
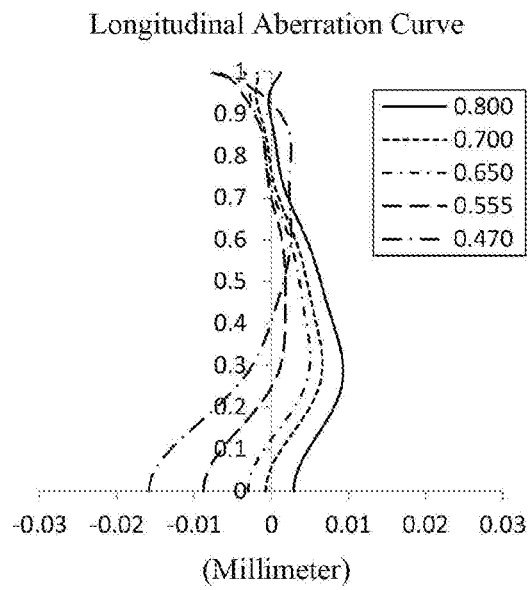
FIGS. 4A to 4D illustrate a longitudinal aberration curve, an astigmatic curve, a distortion curve, and a lateral color curve of the optical imaging system of the Example 2, respectively.
Figure 4B:
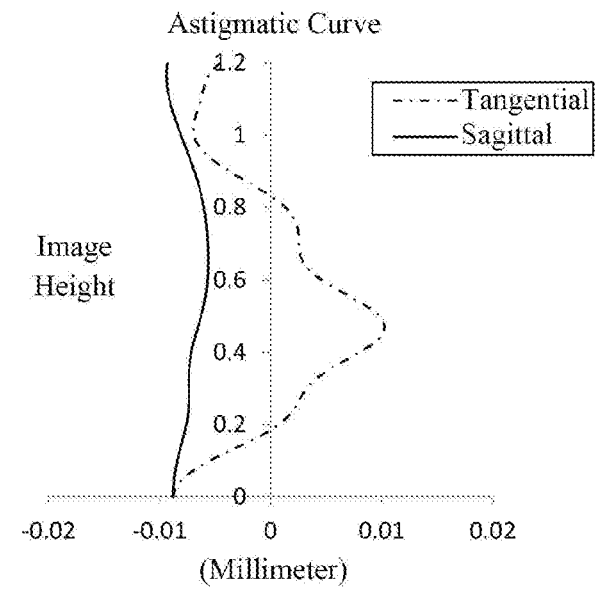
Figure 4C:
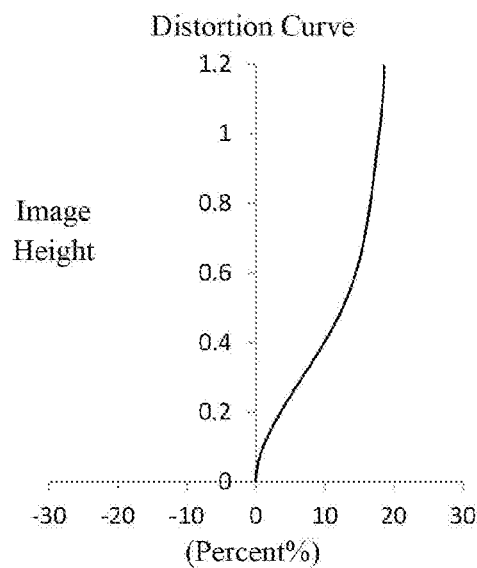
Figure 4D:
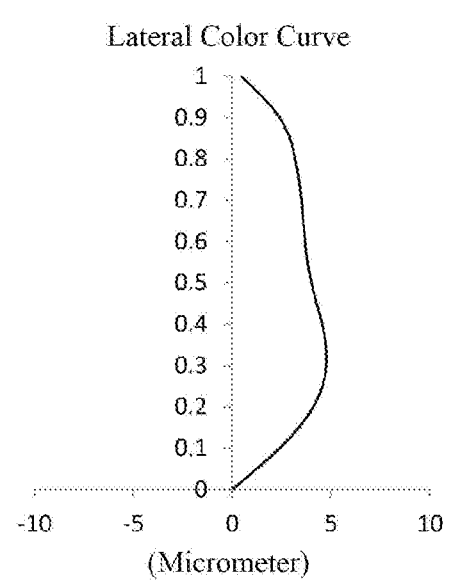

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion at different image heights. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve a good image quality.

Example 3

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 3, a total effective focal length f of the optical imaging system is 0.71 mm, an aperture value Fno of the optical imaging system is 1.50, an on-axis distance TTL from the object-side surface of the first lens to the imaging plane is 5.37 mm, half of a diagonal length ImgH of an effective pixel area on the imaging plane is 1.20 mm, and half of a maximal field-of-view Semi-FOV is 48.3°.

Table 5 is a table illustrating basic parameters of the optical imaging system of example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | spherical | infinite | 300.0000 | | | | |
| S1 | aspheric | −7.6169 | 0.6112 | 1.54 | 55.8 | −2.02 | 15.6693 |
| S2 | aspheric | 1.2971 | 1.9718 | | | | −0.1510 |
| STO | spherical | infinite | −0.0550 | | | | |
| S3 | aspheric | 1.0483 | 0.8054 | 1.54 | 55.8 | 1.06 | 1.1871 |
| S4 | aspheric | −0.9091 | 0.0689 | | | | 0.0787 |
| S5 | aspheric | −5.7361 | 0.3000 | 1.64 | 23.8 | −1.23 | 98.3362 |
| S6 | aspheric | 0.9306 | 0.1042 | | | | 0.2885 |
| S7 | aspheric | −50.0000 | 0.5483 | 1.59 | 61.2 | 1.60 | −99.0000 |
| S8 | aspheric | −0.9338 | 0.0300 | | | | −0.0497 |
| S9 | aspheric | 1.6311 | 0.3000 | 1.64 | 23.8 | 5.30 | 0.8438 |
| S10 | aspheric | 2.9144 | 0.0884 | | | | 2.6441 |
| S11 | spherical | infinite | 0.2100 | 1.52 | 64.2 | | |
| S12 | spherical | infinite | 0.3847 | | | | |
| S13 | spherical | infinite | | | | | |

TABLE 6

| Surface number | A4 | A6 | A8 | A10 | A12 |
|---|---|---|---|---|---|
| S1 | 5.0202E−01 | −6.7500E−01 | 6.4641E−01 | −4.4500E−01 | 2.1278E−01 |
| S2 | 5.5363E−01 | 1.3838E+00 | −1.3351E+01 | 4.4174E+01 | −8.4811E+01 |
| S3 | −2.7064E−01 | 2.9322E−01 | −5.5114E+00 | −8.6786E+01 | 2.1636E+03 |
| S4 | 4.2381E−01 | −8.0693E+00 | 1.2904E+02 | −1.2007E+03 | 6.9589E+03 |
| S5 | −1.2703E+00 | −3.6476E+00 | 7.3485E+01 | −3.8593E+02 | −1.8428E+02 |
| S6 | −8.6476E−01 | −6.6819E+00 | 7.7275E+01 | −4.4906E+02 | 1.6060E+03 |
| S7 | 1.5077E+00 | −1.0600E+01 | 5.6287E+01 | −2.0835E+02 | 4.5942E+02 |
| S8 | 1.1994E+00 | −1.8294E+01 | 1.3400E+02 | −5.5861E+02 | 1.4644E+03 |
| S9 | 7.4443E−01 | −1.6817E+01 | 5.8998E+01 | 3.5100E+01 | −1.1142E+03 |
| S10 | 1.5354E+00 | −1.4804E+01 | 5.8758E+01 | −1.4200E+02 | 2.2053E+02 |

| Surface number | A14 | A16 | A18 | A20 |
|---|---|---|---|---|
| S1 | −6.8371E−02 | 1.4104E−02 | −1.6957E−03 | 9.1000E−05 |
| S2 | 1.0067E+02 | −7.2682E+01 | 2.9283E+01 | −5.0544E+00 |
| S3 | −1.9968E+04 | 9.3955E+04 | −2.2503E+05 | 2.1654E+05 |
| S4 | −2.6178E+04 | 6.1798E+04 | −8.2614E+04 | 4.7430E+04 |
| S5 | 1.1630E+04 | −5.9027E+04 | 1.3190E+05 | −1.1384E+05 |
| S6 | −3.5369E+03 | 4.4886E+03 | −2.7926E+03 | 5.0455E+02 |
| S7 | −3.0490E+02 | −8.9836E+02 | 2.0365E+03 | −1.2571E+03 |
| S8 | −2.4734E+03 | 2.6192E+03 | −1.5355E+03 | 3.4197E+02 |
| S9 | 4.5858E+03 | −9.5950E+03 | 1.0657E+04 | −5.0110E+03 |
| S10 | −2.1809E+02 | 1.3103E+02 | −4.3010E+01 | 5.8250E+00 |

Figure 6C:
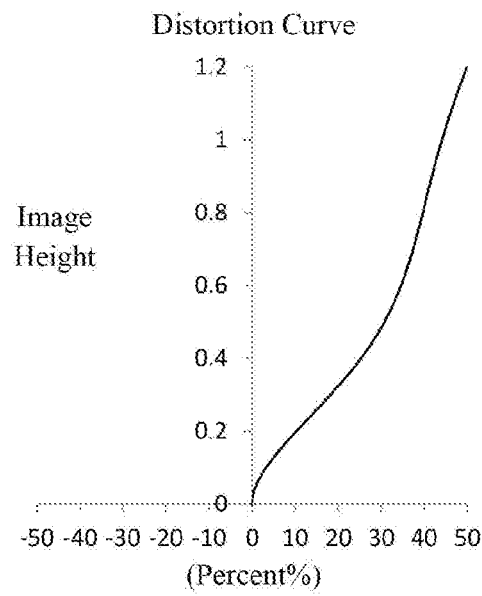
Figure 6D:
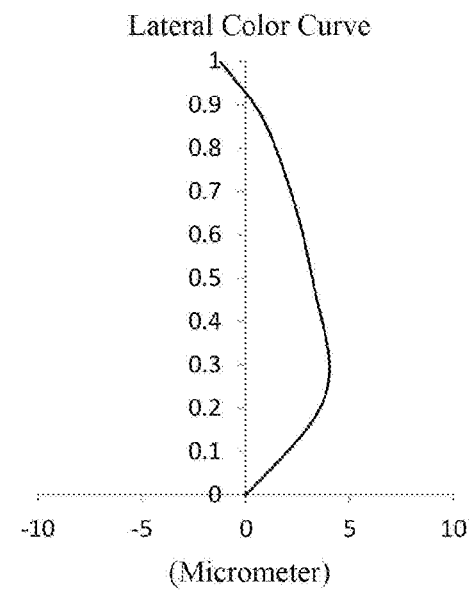

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion at different image heights. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve a good image quality.

Example 4

Figure 7:
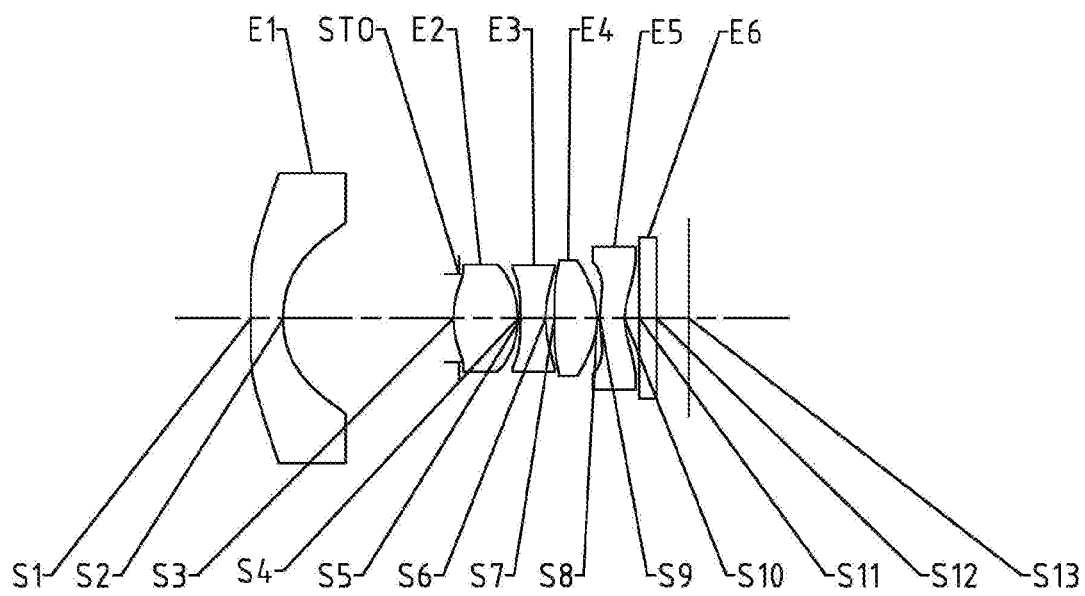
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 4, a total effective focal length f of the optical imaging system is 0.94 mm, an aperture value Fno of the optical imaging system is 1.64, an on-axis distance TTL from the object-side surface of the first lens to the imaging plane is 5.30 mm, half of a diagonal length ImgH of an effective pixel area on the imaging plane is 1.20 mm, and half of a maximal field-of-view Semi-FOV is 48.3°.

Table 7 is a table illustrating basic parameters of the optical imaging system of example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | 300.0000 | | | | |
| S1 | aspheric | −7.6617 | 0.3949 | 1.54 | 55.8 | −2.63 | 15.5024 |
| S2 | aspheric | 1.7626 | 2.1267 | | | | 0.2382 |

TABLE 7-continued

| Surface number | Surface type | Radius of curvature | Thickness/ Distance | Material Refractive index | Abbe number | Focal length | Conic coefficient |
|---|---|---|---|---|---|---|---|
| STO | spherical | infinite | −0.0681 | | | | |
| S3 | aspheric | 1.1371 | 0.7812 | 1.54 | 55.8 | 1.15 | 1.3513 |
| S4 | aspheric | −1.0253 | 0.0300 | | | | 0.2088 |
| S5 | aspheric | −50.0000 | 0.3000 | 1.64 | 23.8 | −1.64 | −99.0000 |
| S6 | aspheric | 1.0753 | 0.1080 | | | | 0.5931 |
| S7 | aspheric | −50.0000 | 0.5193 | 1.59 | 61.2 | 1.50 | −99.0000 |
| S8 | aspheric | −0.8777 | 0.0300 | | | | −0.1871 |
| S9 | aspheric | 1.4571 | 0.3000 | 1.64 | 23.8 | −3.09 | −0.7480 |
| S10 | aspheric | 0.7719 | 0.1795 | | | | −1.0695 |
| S11 | spherical | infinite | 0.2100 | 1.52 | 64.2 | | |
| S12 | spherical | infinite | 0.3867 | | | | |
| S13 | spherical | infinite | | | | | |

TABLE 8

| Surface number | A4 | A6 | A8 | A10 | A12 |
|---|---|---|---|---|---|
| S1 | 4.3552E−01 | −5.9043E−01 | 5.9369E−01 | −4.3638E−01 | 2.2569E−01 |
| S2 | 5.0811E−01 | −5.5977E−02 | −2.4948E+00 | 7.9717E+00 | −1.3543E+01 |
| S3 | −2.6156E−01 | 9.7733E−01 | −2.2308E+01 | 1.9731E+02 | −1.0351E+03 |
| S4 | 3.2183E−01 | −4.7288E+00 | 5.9231E+01 | −4.7714E+02 | 2.3878E+03 |
| S5 | −8.0150E−01 | −2.9694E+00 | 4.9864E+01 | −3.9716E+02 | 1.9231E+03 |
| S6 | −6.9443E−01 | −2.8844E+00 | 2.8101E+01 | −1.4177E+02 | 4.0700E+02 |
| S7 | 9.6374E−01 | −4.8783E+00 | 1.2703E+01 | 3.1364E+01 | −4.8888E+02 |
| S8 | 1.1652E+00 | −1.4644E+01 | 1.3150E+02 | −7.5721E+02 | 2.9557E+03 |
| S9 | −3.3553E−01 | −1.1970E+01 | 7.7612E+01 | −2.9028E+02 | 6.6600E+02 |
| S10 | −8.0195E−01 | −3.9238E+00 | 2.7459E+01 | −8.8319E+01 | 1.7578E+02 |

| Surface number | A14 | A16 | A18 | A20 |
|---|---|---|---|---|
| S1 | −7.8938E−02 | 1.7693E−02 | −2.2909E−03 | 1.3045E−04 |
| S2 | 1.3937E+01 | −8.6340E+00 | 2.9568E+00 | 4.3006E−01 |
| S3 | 2.8867E+03 | −3.2149E+03 | −1.9958E+03 | 5.3406E+03 |
| S4 | −7.6124E+03 | 1.5029E+04 | −1.6715E+04 | 7.9858E+03 |
| S5 | −5.8155E+03 | 1.0550E+04 | −1.0211E+04 | 3.9316E+03 |
| S6 | −5.5302E+02 | 2.3635E+02 | −1.8939E+02 | 5.0586E+02 |
| S7 | 2.2223E+03 | −4.9607E+03 | 5.3552E+03 | −2.1790E+03 |
| S8 | −7.7413E+03 | 1.2980E+04 | −1.2509E+04 | 5.2258E+03 |
| S9 | −8.1057E+02 | 8.3503E+01 | 1.0010E+03 | −8.7578E+02 |
| S10 | −2.2470E+02 | 1.7904E+02 | −8.0797E+01 | 1.5744E+01 |

Figure 8A:
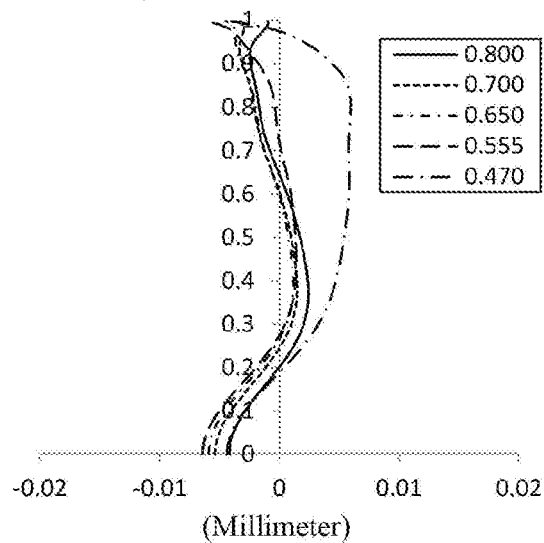
FIGS. 8A to 8D illustrate a longitudinal aberration curve, an astigmatic curve, a distortion curve, and a lateral color curve of the optical imaging system of the Example 4, respectively.
Figure 8B:
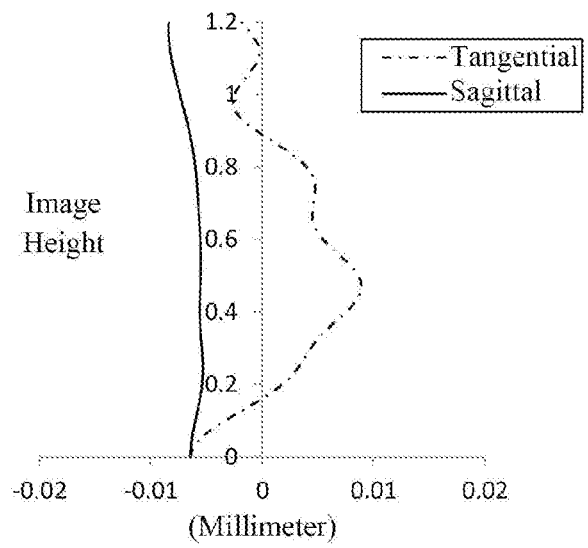
Figure 8C:
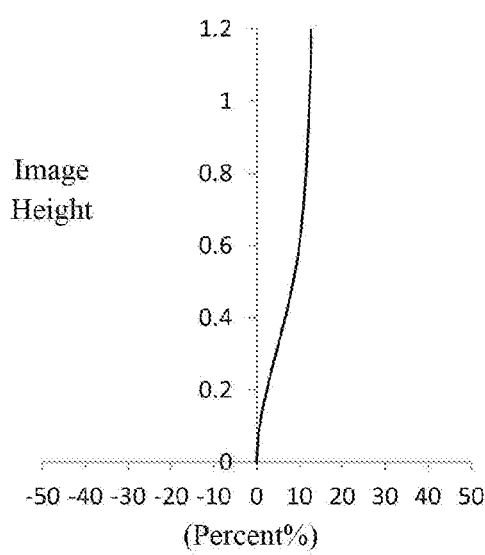
Figure 8D:
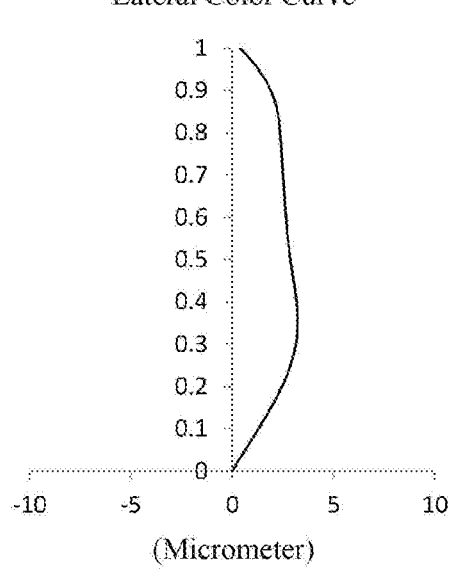

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion at different image heights. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve a good image quality.

Example 5

Figure 9:
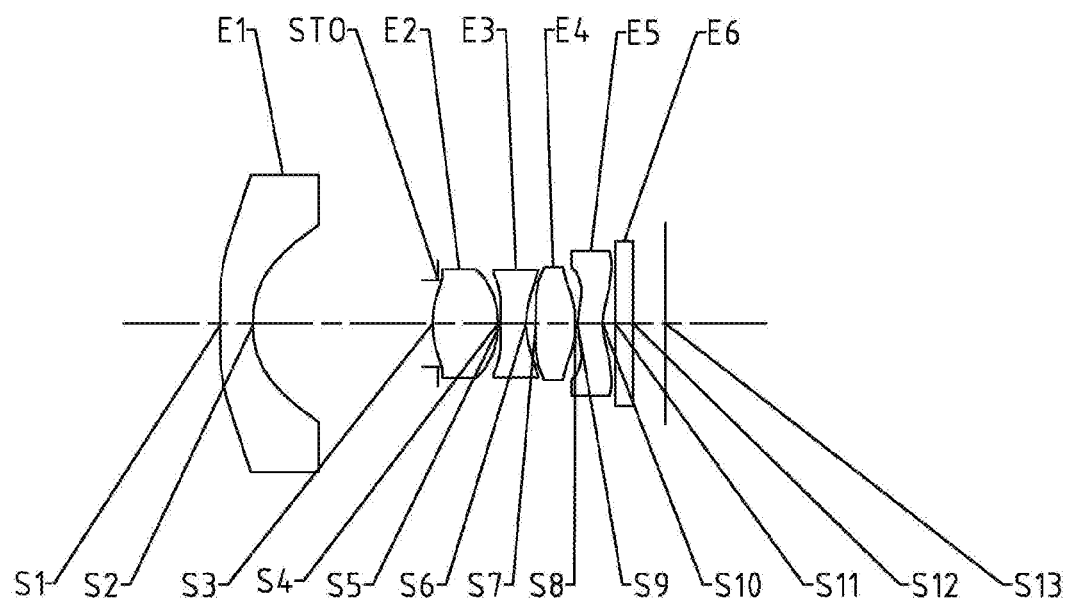
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 5, a total effective focal length f of the optical imaging system is 0.92 mm, an aperture value Fno of the optical imaging system is 1.65, an on-axis distance TTL from the object-side surface of the first lens to the imaging plane is 5.30 mm, half of a diagonal length ImgH of an effective pixel area on the imaging plane is 1.20 mm, and half of a maximal field-of-view Semi-FOV is 48.3°.

Table 9 is a table illustrating basic parameters of the optical imaging system of example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 300.0000 | | | | |
| S1 | aspheric | −7.7394 | 0.3918 | 1.54 | 55.8 | −2.70 | 15.7435 |
| S2 | aspheric | 1.8120 | 2.2008 | | | | 0.2471 |
| STO | spherical | infinite | −0.0658 | | | | |
| S3 | aspheric | 1.1205 | 0.7821 | 1.54 | 55.8 | 1.23 | 1.2980 |
| S4 | aspheric | −1.2190 | 0.0300 | | | | 1.0374 |
| S5 | aspheric | 3.2201 | 0.3000 | 1.64 | 23.8 | −2.10 | −99.0000 |
| S6 | aspheric | 0.9144 | 0.1171 | | | | 0.1572 |
| S7 | aspheric | −6.1472 | 0.4663 | 1.59 | 61.2 | −17.18 | −79.2896 |
| S8 | aspheric | −15.9552 | 0.0300 | | | | −99.0000 |
| S9 | aspheric | 0.5967 | 0.3000 | 1.64 | 23.8 | 2.14 | −1.0388 |
| S10 | aspheric | 0.8510 | 0.1489 | | | | −1.1795 |
| S11 | spherical | infinite | 0.2100 | 1.52 | 64.2 | | |
| S12 | spherical | infinite | 0.3867 | | | | |
| S13 | spherical | infinite | | | | | |

TABLE 10

| Surface number | A4 | A6 | A8 | A10 | A12 |
|---|---|---|---|---|---|
| S1 | 4.7996E−01 | −6.6242E−01 | 6.6465E−01 | −4.8293E−01 | 2.4419E−01 |
| S2 | 5.4110E−01 | 3.6591E−02 | −3.2776E+00 | 1.0079E+01 | −1.6665E+01 |
| S3 | −2.8602E−01 | 1.4920E+00 | −3.1692E+01 | 2.8329E+02 | −1.4593E+03 |
| S4 | −1.4415E+00 | 1.7532E+01 | −1.5041E+02 | 9.1931E+02 | −3.9242E+03 |
| S5 | −2.0668E+00 | 1.4694E+01 | −1.3935E+02 | 9.7654E+02 | −4.6083E+03 |
| S6 | −6.1192E−01 | −4.5295E+00 | 5.8241E+01 | −4.6611E+02 | 2.4949E+03 |
| S7 | 1.4265E+00 | −7.8606E+00 | 6.5697E+01 | −4.5382E+02 | 2.1455E+03 |
| S8 | −7.5996E+00 | 8.7445E+01 | −7.2017E+02 | 4.1808E+03 | −1.6529E+04 |
| S9 | −7.6663E+00 | 7.1756E+01 | −6.1155E+02 | 3.6071E+03 | −1.4233E+04 |
| S10 | −1.9035E−01 | −9.7342E+00 | 5.7603E+01 | −1.8780E+02 | 3.9003E+02 |

| Surface number | A14 | A16 | A18 | A20 |
|---|---|---|---|---|
| S1 | −8.2657E−02 | 1.7797E−02 | −2.2041E−03 | 1.1991E−04 |
| S2 | 1.6619E+01 | −9.9153E+00 | 3.2533E+00 | −4.5130E−01 |
| S3 | 3.7017E+03 | −1.7912E+03 | −1.0915E+04 | 1.6352E+04 |
| S4 | 1.1120E+04 | −1.9698E+04 | 1.9616E+04 | −8.3512E+03 |
| S5 | 1.3894E+04 | −2.5134E+04 | 2.4436E+04 | −9.5595E+03 |
| S6 | −8.5774E+03 | 1.7802E+04 | −2.0107E+04 | 9.4383E+03 |
| S7 | −6.4310E+03 | 1.1515E+04 | −1.1128E+04 | 4.4224E+03 |
| S8 | 4.3303E+04 | −7.1533E+04 | 6.7209E+04 | −2.7332E+04 |
| S9 | 3.6908E+04 | −6.0381E+04 | 5.6546E+04 | −2.3184E+04 |
| S10 | −5.2287E+02 | 4.3687E+02 | −2.0672E+02 | 4.2297E+01 |

Figures 10A, 10B:
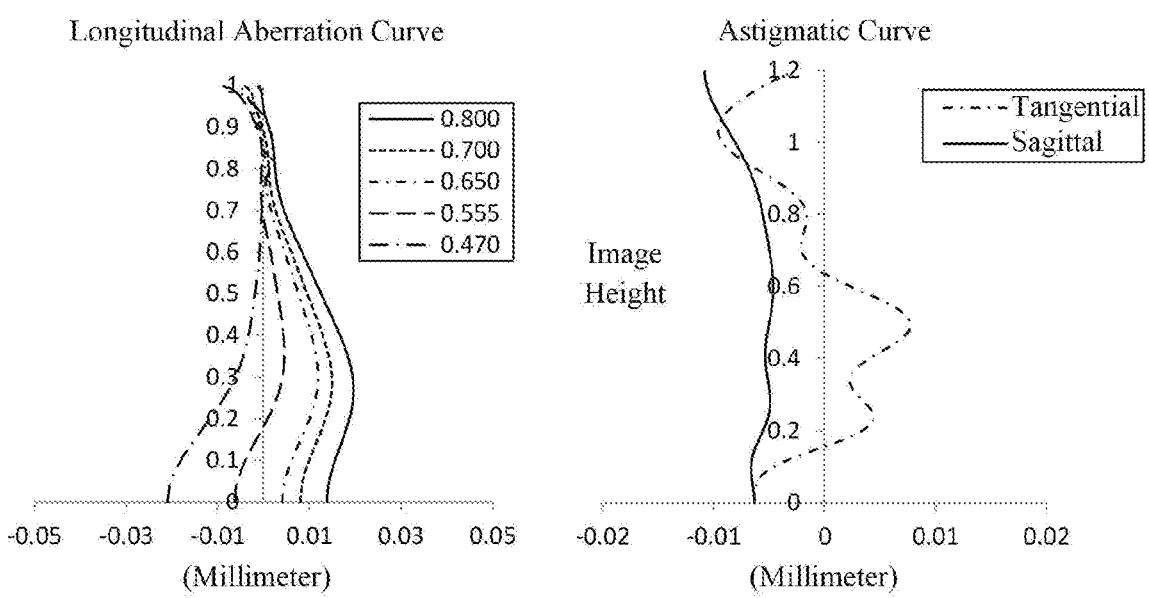
FIGS. 10A to 10D illustrate a longitudinal aberration curve, an astigmatic curve, a distortion curve, and a lateral color curve of the optical imaging system of the Example 5, respectively.
Figure 10C:
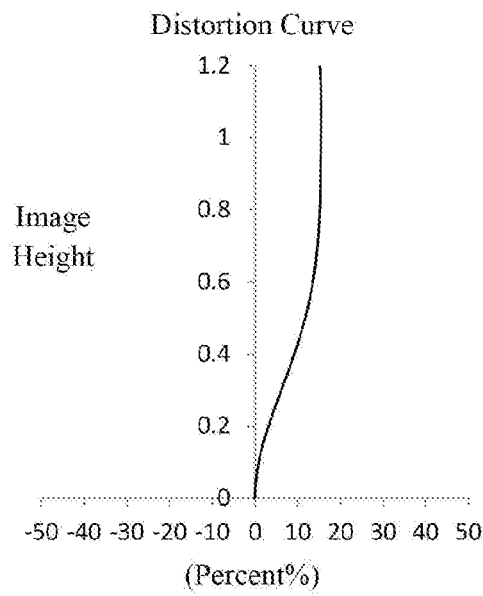
Figure 10D:
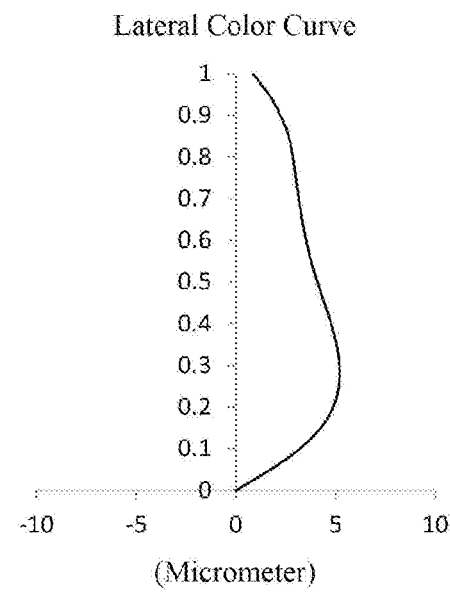

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion at different image heights. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve a good image quality.

Example 6

Figure 11:
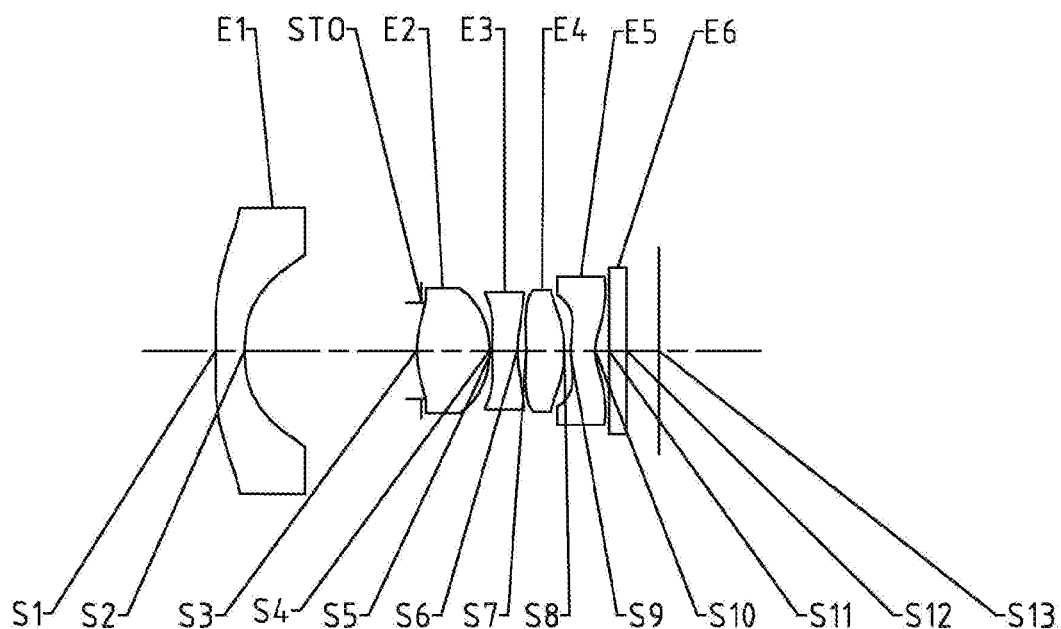
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 6, a total effective focal length f of the optical imaging system is 1.10 mm, an aperture value Fno of the optical imaging system is 1.65, an on-axis distance TTL from the object-side surface of the first lens to the imaging plane is 5.30 mm, half of a diagonal length ImgH of an effective pixel area on the imaging plane is 1.20 mm, and half of a maximal field-of-view Semi-FOV is 48.3°.

Table 11 is a table illustrating basic parameters of the optical imaging system of example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 300.0000 | | | | |
| S1 | aspheric | −7.5497 | 0.3445 | 1.54 | 55.8 | −3.02 | 17.2097 |
| S2 | aspheric | 2.0968 | 2.1166 | | | | 0.6594 |
| STO | spherical | infinite | −0.0572 | | | | |
| S3 | aspheric | 1.2993 | 0.8730 | 1.54 | 55.8 | 1.33 | 1.6364 |
| S4 | aspheric | −1.2154 | 0.0300 | | | | 0.6330 |
| S5 | aspheric | 3.0718 | 0.3000 | 1.64 | 23.8 | −6.41 | −76.0833 |
| S6 | aspheric | 1.6903 | 0.1078 | | | | 1.8223 |
| S7 | aspheric | −2.0912 | 0.4541 | 1.59 | 61.2 | −24.30 | −58.9888 |
| S8 | aspheric | −2.6442 | 0.0697 | | | | 9.1535 |
| S9 | aspheric | 0.7143 | 0.3000 | 1.64 | 23.8 | −73.35 | −2.5923 |
| S10 | aspheric | 0.5882 | 0.1634 | | | | −1.9110 |
| S11 | spherical | infinite | 0.2100 | 1.52 | 64.2 | | |
| S12 | spherical | infinite | 0.3867 | | | | |
| S13 | spherical | infinite | | | | | |

TABLE 12

| Surface number | A4 | A6 | A8 | A10 | A12 |
|---|---|---|---|---|---|
| S1 | 4.2531E−01 | −7.0132E−01 | 8.8828E−01 | −7.9272E−01 | 4.8500E−01 |
| S2 | 4.8065E−01 | −1.9591E−01 | −2.4213E+00 | 9.6614E+00 | −1.8447E+01 |
| S3 | −2.6681E−01 | 1.2997E+00 | −2.2512E+01 | 1.7009E+02 | −7.7581E+02 |
| S4 | −2.7279E−01 | −2.2910E+00 | 3.4594E+01 | −2.1328E+02 | 7.7335E+02 |
| S5 | −3.0889E−01 | −6.1653E+00 | 4.5268E+01 | −2.2366E+02 | 8.2401E+02 |
| S6 | 6.7999E−01 | −1.1407E+01 | 7.6381E+01 | −4.1852E+02 | 1.6799E+03 |
| S7 | 1.1047E+00 | −5.3430E+00 | 3.8262E+01 | −2.4767E+02 | 1.0784E+03 |
| S8 | −3.5265E+00 | 3.2390E+01 | −2.0451E+02 | 9.6975E+02 | −3.2810E+03 |
| S9 | −4.9088E+00 | 2.2791E+01 | −1.1906E+02 | 5.9358E+02 | −2.3144E+03 |
| S10 | −2.3725E+00 | 5.1219E+00 | 2.3651E+00 | −5.0621E+01 | 1.5740E+02 |

| Surface number | A14 | A16 | A18 | A20 |
|---|---|---|---|---|
| S1 | −1.9827E−01 | 5.1619E−02 | −7.7324E−03 | 5.0779E−04 |
| S2 | 2.0579E+01 | −1.3592E+01 | 4.9094E+00 | −7.4662E−01 |
| S3 | 2.0155E+03 | −2.6957E+03 | 1.1728E+03 | 4.0383E+02 |
| S4 | −1.7744E+03 | 2.5341E+03 | −2.0567E+03 | 7.2264E+02 |
| S5 | −2.1831E+03 | 3.8600E+03 | −3.9619E+03 | 1.7500E+03 |
| S6 | −4.5187E+03 | 7.6026E+03 | −7.1272E+03 | 2.8107E+03 |
| S7 | −2.9751E+03 | 5.0221E+03 | −4.7002E+03 | 1.8588E+03 |
| S8 | 7.6112E+03 | −1.1430E+04 | 9.9175E+03 | −3.7304E+03 |
| S9 | 6.1514E+03 | −1.0296E+04 | 9.6079E+03 | −3.7392E+03 |
| S10 | −2.6042E+02 | 2.5051E+02 | −1.3200E+02 | 2.9516E+01 |

Figure 12A:
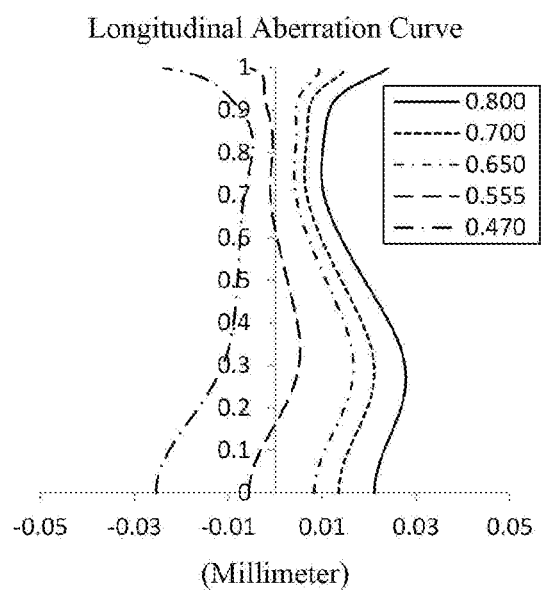
FIGS. 12A to 12D illustrate a longitudinal aberration curve, an astigmatic curve, a distortion curve, and a lateral color curve of the optical imaging system of the Example 6, respectively.
Figure 12B:
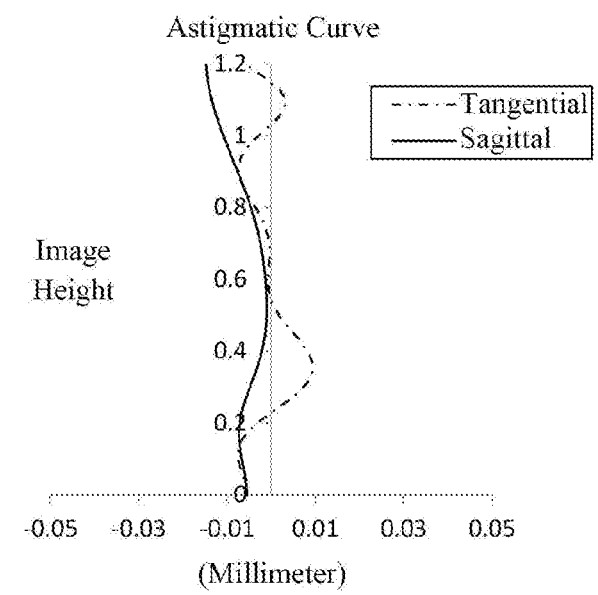
Figure 12C:
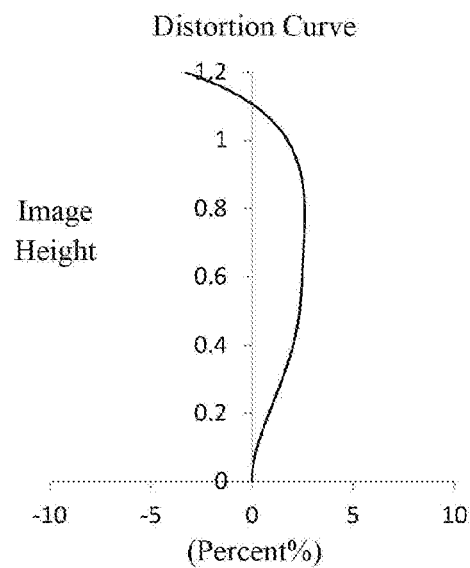
Figure 12D:
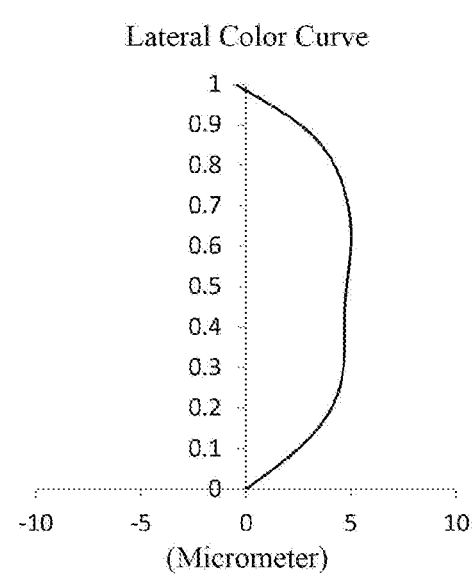

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion at different image heights. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve a good image quality.

Example 7

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 7, a total effective focal length f of the optical imaging system is 1.03 mm, an aperture value Fno of the optical imaging system is 1.65, an on-axis distance TTL from the object-side surface of the first lens to the imaging plane is 5.35 mm, half of a diagonal length ImgH of an effective pixel area on the imaging plane is 1.20 mm, and half of a maximal field-of-view Semi-FOV is 48.3°.

Table 13 is a table illustrating basic parameters of the optical imaging system of example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 300.0000 | | | | |
| S1 | aspheric | −7.7609 | 0.3593 | 1.54 | 55.8 | −2.98 | 15.8479 |
| S2 | aspheric | 2.0446 | 2.3163 | | | | 0.3471 |
| STO | spherical | infinite | −0.1321 | | | | |
| S3 | aspheric | 1.0132 | 0.7456 | 1.54 | 55.8 | 1.92 | 1.3836 |
| S4 | aspheric | 50.0000 | 0.0373 | | | | −99.0000 |
| S5 | aspheric | 1.0487 | 0.3000 | 1.64 | 23.8 | −15.53 | −32.8590 |
| S6 | aspheric | 0.8427 | 0.1339 | | | | 0.1143 |
| S7 | aspheric | −50.0000 | 0.5310 | 1.59 | 61.2 | 1.23 | −99.0000 |
| S8 | aspheric | −0.7237 | 0.0300 | | | | −0.4560 |
| S9 | aspheric | 6.0277 | 0.3069 | 1.64 | 23.8 | −1.75 | 57.9638 |
| S10 | aspheric | 0.9281 | 0.1236 | | | | −1.0120 |
| S11 | spherical | infinite | 0.2100 | 1.52 | 64.2 | | |
| S12 | spherical | infinite | 0.3867 | | | | |
| S13 | spherical | infinite | | | | | |

TABLE 14

| Surface number | A4 | A6 | A8 | A10 | A12 |
|---|---|---|---|---|---|
| S1 | 4.4234E−01 | −5.8542E−01 | 5.9190E−01 | −4.4418E−01 | 2.3395E−01 |
| S2 | 5.1420E−01 | −1.9202E−01 | −1.4706E+00 | 4.8940E+00 | −8.1662E+00 |
| S3 | −2.2550E−01 | 5.6278E−01 | −1.5283E+01 | 1.3822E+02 | −8.2520E+02 |
| S4 | −3.9879E+00 | 3.9020E+01 | −2.9945E+02 | 1.6739E+03 | −6.5593E+03 |
| S5 | −9.5526E−01 | −5.8149E+00 | 1.1976E+02 | −1.1773E+03 | 6.9633E+03 |
| S6 | −7.4268E−01 | −3.8819E+00 | 4.4710E+01 | −2.9944E+02 | 1.3344E+03 |
| S7 | 8.2801E−01 | −3.4050E+00 | 2.3793E+01 | −1.4486E+02 | 6.2245E+02 |
| S8 | 1.0667E+00 | −5.0887E+00 | 2.0049E+01 | −3.0075E+00 | −3.1282E+02 |
| S9 | −8.2039E−01 | −2.2218E+00 | −8.9341E+00 | 2.0419E+02 | −1.1958E+03 |
| S10 | −1.3591E+00 | 1.6161E+00 | −6.3530E−01 | 8.5558E−01 | −1.0661E+01 |

TABLE 14-continued

| Surface number | A14 | A16 | A18 | A20 |
|---|---|---|---|---|
| S1 | −8.2893E−02 | 1.8735E−02 | −2.4358E−03 | 1.3873E−04 |
| S2 | 8.1209E+00 | −4.8276E+00 | 1.5812E+00 | −2.1936E−01 |
| S3 | 3.1067E+03 | −7.3868E+03 | 1.0174E+04 | −6.4027E+03 |
| S4 | 1.7166E+04 | −2.8339E+04 | 2.6542E+04 | −1.0692E+04 |
| S5 | −2.5856E+04 | 5.8657E+04 | −7.4227E+04 | 4.0285E+04 |
| S6 | −4.0295E+03 | 7.9141E+03 | −9.1428E+03 | 4.7217E+03 |
| S7 | −1.8318E+03 | 3.5255E+03 | −3.9653E+03 | 1.9575E+03 |
| S8 | 1.4258E+03 | −3.0943E+03 | 3.4830E+03 | −1.6208E+03 |
| S9 | 3.7066E+03 | −6.6112E+03 | 6.4304E+03 | −2.6422E+03 |
| S10 | 3.0945E+01 | −4.1080E+01 | 2.6820E+01 | −6.9976E+00 |

Figure 14C:
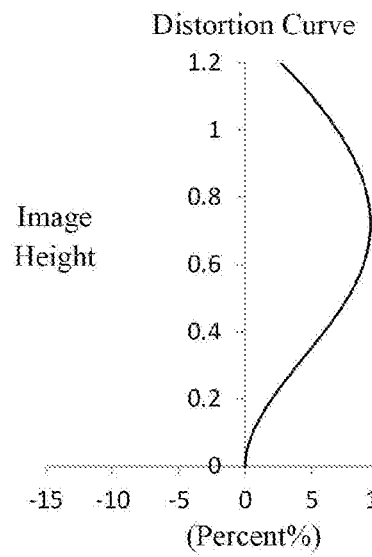
Figure 14D:
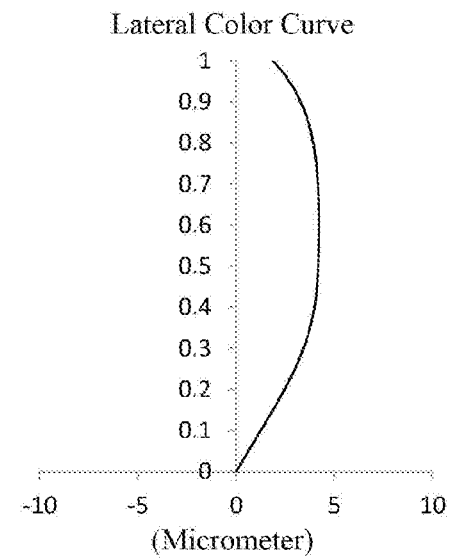

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion at different image heights. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve a good image quality.

Example 8

Figure 15:
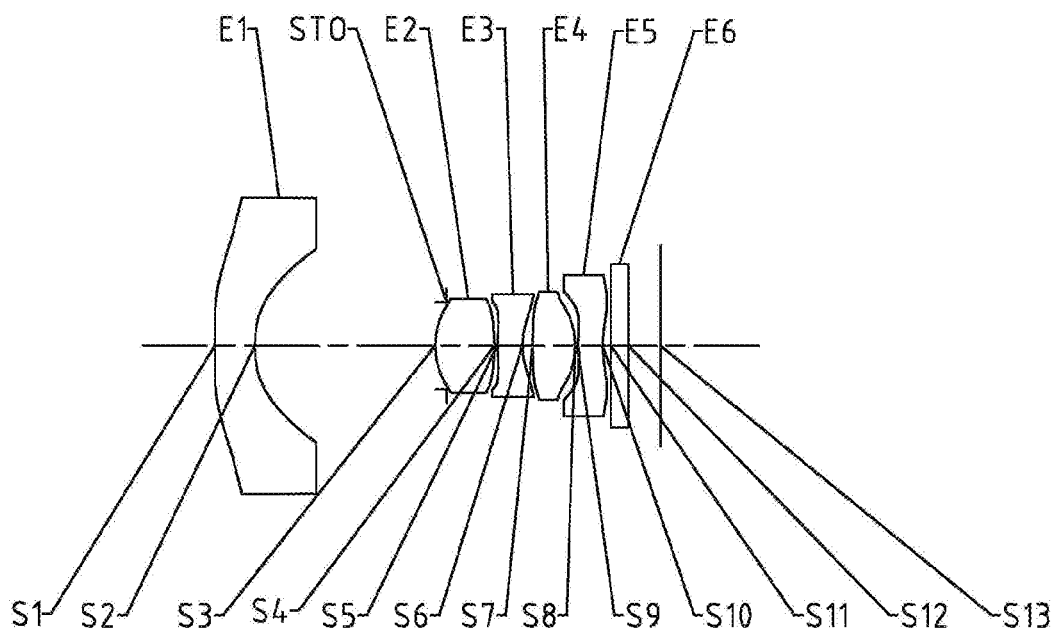
FIG. 15 illustrates a schematic structural view of an optical imaging system according to Example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 8, a total effective focal length f of the optical imaging system is 0.91 mm, an aperture value Fno of the optical imaging system is 1.66, an on-axis distance TTL from the object-side surface of the first lens to the imaging plane is 5.35 mm, half of a diagonal length ImgH of an effective pixel area on the imaging plane is 1.20 mm, and half of a maximal field-of-view Semi-FOV is 48.3°.

Table 15 is a table illustrating basic parameters of the optical imaging system of example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Material Abbe number | Focal length | Conic coefficient |
|---|---|---|---|---|---|---|---|
| OBJ | spherical | infinite | 300.0000 | | | | |
| S1 | aspheric | −7.9527 | 0.4798 | 1.54 | 55.8 | −2.64 | 16.9108 |
| S2 | aspheric | 1.7645 | 2.3006 | | | | −0.0489 |
| STO | spherical | infinite | −0.1381 | | | | |
| S3 | aspheric | 0.9041 | 0.7152 | 1.54 | 55.8 | 1.71 | 1.1664 |
| S4 | aspheric | 50.0000 | 0.0342 | | | | −99.0000 |
| S5 | aspheric | 1.1106 | 0.3000 | 1.64 | 23.8 | −6.23 | −40.9416 |
| S6 | aspheric | 0.7771 | 0.1256 | | | | −0.0658 |
| S7 | aspheric | −40.0000 | 0.5097 | 1.59 | 61.2 | 2.23 | −99.0000 |
| S8 | aspheric | −1.2830 | 0.0300 | | | | 0.4835 |
| S9 | aspheric | 1.4501 | 0.3000 | 1.64 | 23.8 | 28.04 | −7.5222 |
| S10 | aspheric | 1.4501 | 0.0963 | | | | 0.3729 |
| S11 | spherical | infinite | 0.2100 | 1.52 | 64.2 | | |
| S12 | spherical | infinite | 0.3852 | | | | |
| S13 | spherical | infinite | | | | | |

TABLE 16

| Surface number | A4 | A6 | A8 | A10 | A12 |
|---|---|---|---|---|---|
| S1 | 4.7848E−01 | −6.5727E−01 | 6.6001E−01 | −4.8683E−01 | 2.5081E−01 |
| S2 | 5.8088E−01 | −8.2638E−02 | −3.0914E+00 | 9.8474E+00 | −1.6605E+01 |
| S3 | −2.6137E−01 | 1.6902E+00 | −4.3000E+01 | 5.0706E+02 | −3.8274E+03 |
| S4 | −4.6687E+00 | 5.5547E+01 | −4.9959E+02 | 3.2194E+03 | −1.4067E+04 |
| S5 | −1.8260E+00 | 2.7258E+00 | 5.9200E+01 | −1.0297E+03 | 7.9806E+03 |
| S6 | −1.1963E+00 | −2.8916E+00 | 6.3816E+01 | −5.7382E+02 | 3.0905E+03 |
| S7 | 8.1247E−01 | −2.7421E+00 | 5.8537E+00 | 1.1411E+02 | −1.4291E+03 |
| S8 | −2.6776E+00 | 2.3031E+01 | −1.7948E+02 | 1.1640E+03 | −5.2910E+03 |
| S9 | −2.8174E+00 | 1.5532E+01 | −1.8257E+02 | 1.3707E+03 | −6.1102E+03 |
| S10 | 6.4182E−01 | −1.4933E+01 | 7.6638E+01 | −2.3370E+02 | 4.6307E+02 |

| Surface number | A14 | A16 | A18 | A20 |
|---|---|---|---|---|
| S1 | −8.6569E−02 | 1.9034E−02 | −2.4120E−03 | 1.3447E−04 |
| S2 | 1.6899E+01 | −1.0320E+01 | 3.4809E+00 | −4.9853E−01 |
| S3 | 1.8195E+04 | −5.3421E+04 | 8.8343E+04 | −6.3563E+04 |
| S4 | 3.8946E+04 | −6.2706E+04 | 4.8566E+04 | −9.1467E+03 |
| S5 | −3.5729E+04 | 9.1395E+04 | −1.2281E+05 | 6.6833E+04 |
| S6 | −1.0366E+04 | 2.0953E+04 | −2.3304E+04 | 1.0852E+04 |
| S7 | 7.6383E+03 | −2.1570E+04 | 3.1467E+04 | −1.8794E+04 |
| S8 | 1.5840E+04 | −2.9878E+04 | 3.2603E+04 | −1.5803E+04 |
| S9 | 1.6531E+04 | −2.6617E+04 | 2.3407E+04 | −8.6391E+03 |
| S10 | −5.9881E+02 | 4.8906E+02 | −2.3030E+02 | 4.7951E+01 |

Figure 16A:
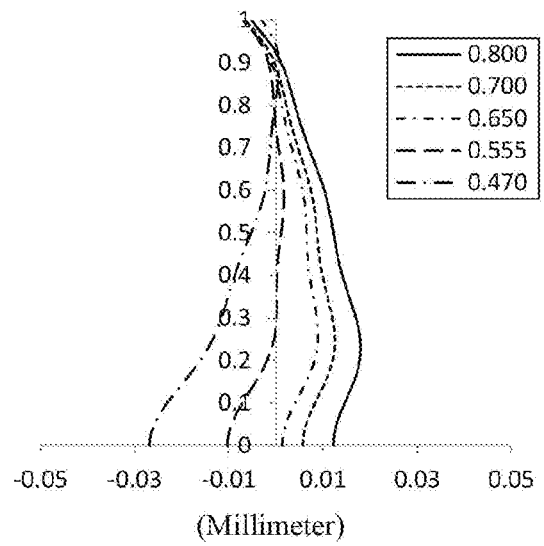
FIGS. 16A to 16D illustrate a longitudinal aberration curve, an astigmatic curve, a distortion curve, and a lateral color curve of the optical imaging system of the Example 8, respectively.
Figure 16B:
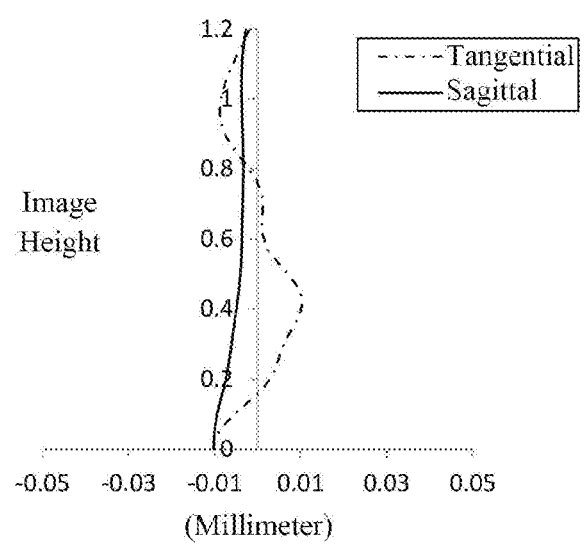
Figure 16C:
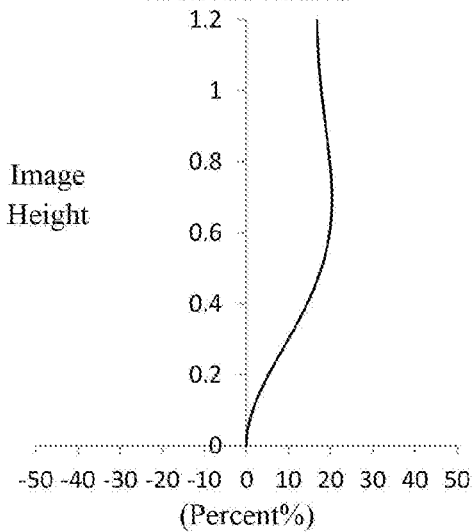
Figure 16D:
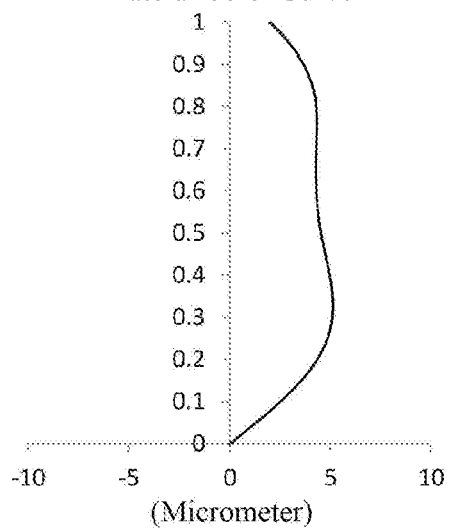

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion at different image heights. FIG. 16D illustrates a lateral color curve of the optical imaging system according to example 8, representing deviations of different image heights on an imaging plane after light passes through the optical imaging system. It can be seen from FIG. 16A to FIG. 16D that the optical imaging system provided in example 8 may achieve a good image quality.

In view of the above, examples 1 to 8 respectively satisfy the relationship shown in Table 17.

TABLE 17

| | Example | | | | | | | |
|---|---|---|---|---|---|---|---|---|
| Condition | 1 | 2 | 3 | 4 | 5 | 6 | 7 | 8 |
| f1/f2 | −2.16 | −2.01 | −1.90 | −2.29 | −2.19 | −2.27 | −1.55 | −1.55 |
| R10/R9 | 0.38 | 0.97 | 1.79 | 0.53 | 1.43 | 0.82 | 0.15 | 1.00 |
| ImgH/f | 1.15 | 1.34 | 1.69 | 1.27 | 1.30 | 1.09 | 1.16 | 1.32 |
| TTL/T12 | 2.69 | 2.61 | 2.80 | 2.57 | 2.48 | 2.57 | 2.45 | 2.47 |
| R1/EPD/10 | −1.21 | −1.32 | −1.60 | −1.33 | −1.38 | −1.13 | −1.24 | −1.45 |
| \|R2/f\| + \|R3/f\| | 3.05 | 3.17 | 3.30 | 3.07 | 3.18 | 3.09 | 2.96 | 2.94 |
| SAG12/SAG11 | 2.22 | 2.14 | 1.90 | 2.22 | 2.14 | 2.45 | 2.24 | 2.27 |
| f23/f12 | 1.93 | 2.17 | 2.93 | 2.49 | 2.08 | 1.49 | 1.05 | 1.24 |
| ET1/CT1 | 1.97 | 1.98 | 1.54 | 2.05 | 2.06 | 2.24 | 2.22 | 1.86 |
| (tan(Semi-FOV) + Fno)/f (mm$^{-1}$) | 2.65 | 2.98 | 3.68 | 2.93 | 3.01 | 2.53 | 2.69 | 3.06 |
| ΣAT/CT2 | 3.00 | 2.73 | 2.63 | 2.85 | 2.96 | 2.60 | 3.20 | 3.29 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
   a first lens having a negative refractive power with a concave object-side surface and a concave image-side surface;
   a second lens having a refractive power;
   a third lens having a negative refractive power;
   a fourth lens having a refractive power, a concave object-side surface and a convex image-side surface; and
   a fifth lens having a refractive power;
   wherein −2.3≤f1/f2<−1.5, where f1 is an effective focal length of the first lens and f2 is an effective focal length of the second lens;
   wherein 2.5<ΣAT/CT2<3.5,
   wherein ΣAT is a sum of spaced intervals along the optical axis between each two adjacent lenses of the first lens to the fifth lens and CT2 is a center thickness of the second lens along the optical axis.

2. The optical imaging system according to claim 1, wherein −2.0<R1/EPD/10<−1.0, where R1 is a radius of curvature of the object-side surface of the first lens and EPD is an entrance pupil diameter of the optical imaging system.

3. The optical imaging system according to claim 1, wherein 0<R10/R9≤1.8, where R9 is a radius of curvature of an object-side surface of the fifth lens and R10 is a radius of curvature of an image-side surface of the fifth lens.

4. The optical imaging system according to claim 1, wherein 1.0<ImgH/f<2.0, where ImgH is half of a diagonal length of an effective pixel area on an imaging plane of the optical imaging system and f is an effective focal length of the optical imaging system.

5. The optical imaging system according to claim 1, wherein 2.0<TTL/T12<3.0, where TTL is an on-axis distance from the object-side surface of the first lens to an imaging plane of the optical imaging system and T12 is a spaced interval between the first lens and the second lens along the optical axis.

6. The optical imaging system according to claim 1, wherein 2.5<|R2/f|+|R3/f|<3.5, where R2 is a radius of curvature of the image-side surface of the first lens, R3 is a radius of curvature of an object-side surface of the second lens and f is an effective focal length of the optical imaging system.

7. The optical imaging system according to claim 1, wherein 1.5<SAG12/SAG11<2.5, where SAG11 is an on-axis distance from an intersection of the object-side surface of the first lens and the optical axis to a vertex of an effective radius of the object-side surface of the first lens and SAG12 is an on-axis distance from an intersection of the image-side surface of the first lens and the optical axis to an vertex of an effective radius of the image-side surface of the first lens.

8. The optical imaging system according to claim 1, wherein 1.0<f23/f12≤3.0, where f23 is a combined focal length of the second lens and the third lens and f12 is a combined focal length of the first lens and the second lens.

9. The optical imaging system according to claim 1, wherein 1.5<ET1/CT1<2.5, where ET1 is an edge thickness of the first lens and CT1 is a center thickness of the first lens along the optical axis.

10. The optical imaging system according to claim 1, wherein 2.5 mm$^{-1}$<(tan(Semi-FOV)+Fno)/f<3.7 mm$^{-1}$, where Semi-FOV is half of a maximal field-of-view of the optical imaging system, Fno is an aperture value of the optical imaging system and f is an effective focal length of the optical imaging system.

11. The optical imaging system according to claim 10, wherein −2.0<R1/EPD/10<−1.0, where R1 is a radius of curvature of the object-side surface of the first lens and EPD is an entrance pupil diameter of the optical imaging system.

12. The optical imaging system according to claim 10, wherein 0<R10/R9≤1.8, where R9 is a radius of curvature of an object-side surface of the fifth lens and R10 is a radius of curvature of an image-side surface of the fifth lens.

13. The optical imaging system according to claim 10, wherein 1.0<ImgH/f<2.0, where ImgH is half of a diagonal length of an effective pixel area on an imaging plane of the optical imaging system and f is the effective focal length of the optical imaging system.

14. The optical imaging system according to claim 10, wherein 2.0<TTL/T12<3.0, where TTL is an on-axis distance from the object-side surface of the first lens to an imaging plane of the optical imaging system and T12 is a spaced interval between the first lens and the second lens along the optical axis.

15. The optical imaging system according to claim 10, wherein 2.5<|R2/f|+|R3/f|<3.5, where R2 is a radius of curvature of the image-side surface of the first lens, R3 is a radius of curvature of an object-side surface of the second lens and f is the effective focal length of the optical imaging system.

16. The optical imaging system according to claim 10, wherein 1.5<SAG12/SAG11<2.5, where SAG11 is an on-axis distance from an intersection of the object-side surface of the first lens and the optical axis to a vertex of an effective radius of the object-side surface of the first lens and SAG12 is an on-axis distance from an intersection of the image-side surface of the first lens and the optical axis to a vertex of an effective radius of the image-side surface of the first lens.

17. The optical imaging system according to claim 10, wherein 1.0<f23/f12≤3.0, where f23 is a combined focal length of the second lens and the third lens and f12 is a combined focal length of the first lens and the second lens.

18. The optical imaging system according to claim 10, wherein 1.5<ET1/CT1<2.5, where ET1 is an edge thickness of the first lens and CT1 is a center thickness of the first lens along the optical axis.

* * * * *